(12) United States Patent
Speelman et al.

(10) Patent No.: US 11,493,989 B2
(45) Date of Patent: Nov. 8, 2022

(54) MODES OF USER INTERACTION

(71) Applicant: Magic Leap, Inc., Plantation, FL (US)

(72) Inventors: Daniel Stephen Speelman, Fairview, PA (US); Rodrigo Cano, Plantation, FL (US); Kara Lauren Gundersen, Fort Lauderdale, FL (US); Griffith Buckley Hazen, San Francisco, CA (US); Lorena Pazmino, Wilton Manors, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/089,106

(22) Filed: Nov. 4, 2020

(65) Prior Publication Data
US 2021/0141444 A1    May 13, 2021

Related U.S. Application Data

(60) Provisional application No. 62/933,139, filed on Nov. 8, 2019.

(51) Int. Cl.
*G06F 3/01* (2006.01)
*G06F 3/0346* (2013.01)
*G02B 27/01* (2006.01)
*G06F 3/04812* (2022.01)
*G06F 3/0354* (2013.01)

(52) U.S. Cl.
CPC ............ *G06F 3/011* (2013.01); *G02B 27/017* (2013.01); *G06F 3/0346* (2013.01); *G06F 3/03547* (2013.01); *G06F 3/04812* (2013.01)

(58) Field of Classification Search
CPC .... G06F 3/011; G06F 3/0346; G06F 3/03547; G06F 3/04812; G02B 27/017
See application file for complete search history.

(56) References Cited

U.S. PATENT DOCUMENTS

| | | | |
|---|---|---|---|
| 6,850,221 B1 | 2/2005 | Tickle | |
| 2006/0028436 A1 | 2/2006 | Armstrong | |
| 2007/0081123 A1 | 4/2007 | Lewis | |
| 2012/0127062 A1 | 5/2012 | Bar-Zeev et al. | |

(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.

(Continued)

*Primary Examiner* — Yu Chen
(74) *Attorney, Agent, or Firm* — Knobbe, Martens, Olson & Bear, LLP

(57) ABSTRACT

A mixed reality (MR) device can allow a user to switch between input modes to allow interactions with a virtual environment via devices such as a six degrees of freedom (6DoF) handheld controller and a touchpad input device. A default input mode for interacting with virtual content may rely on the user's head pose, which may be difficult to use in selecting virtual objects that are far away in the virtual environment. Thus, the system may be configured to allow the user to use a 6DoF cursor, and a visual ray that extends from the handheld controller to the cursor, to enable precise targeting. Input via a touchpad input device (e.g., that allows three degrees of freedom movements) may also be used in conjunction with the 6DoF cursor.

15 Claims, 25 Drawing Sheets

(56) References Cited

U.S. PATENT DOCUMENTS

| | | |
|---|---|---|
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2017/0024024 A1* | 1/2017 | Khan .................. G06F 3/017 |
| 2017/0109936 A1* | 4/2017 | Powderly ............ G06F 3/013 |
| 2017/0287225 A1* | 10/2017 | Powderly .......... G06F 3/04815 |
| 2018/0307303 A1* | 10/2018 | Powderly ............ G06F 3/013 |
| 2021/0109606 A1* | 4/2021 | Erivantcev ......... G06F 3/038 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

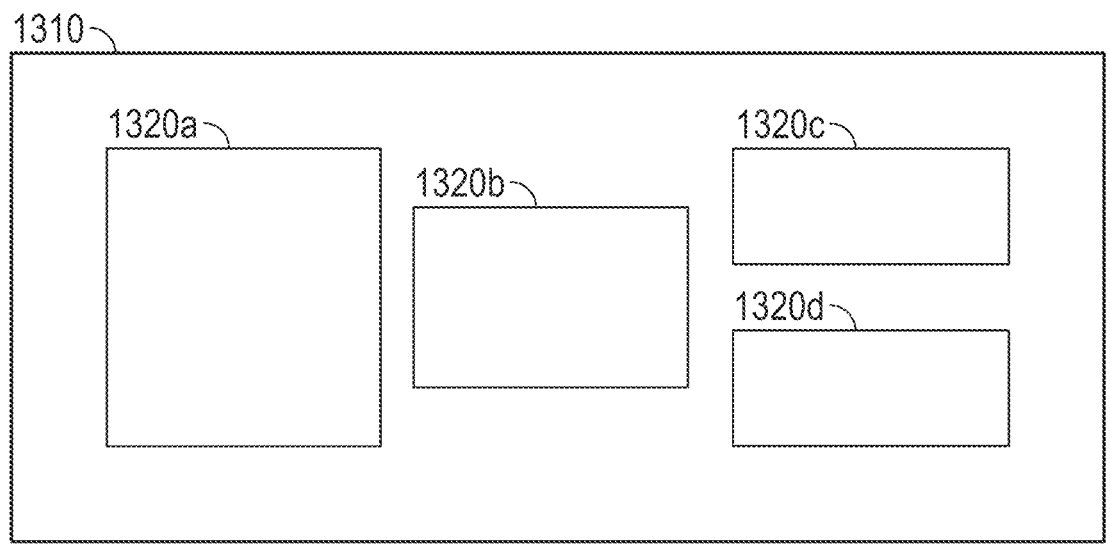
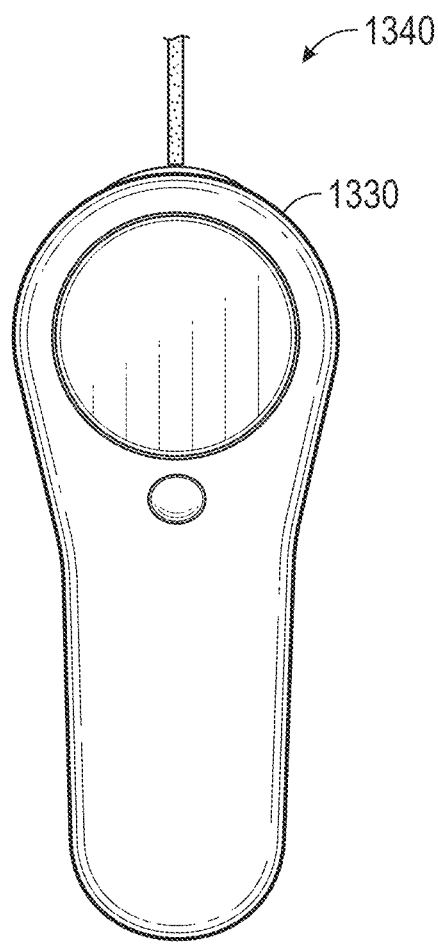
FIG. 13A1

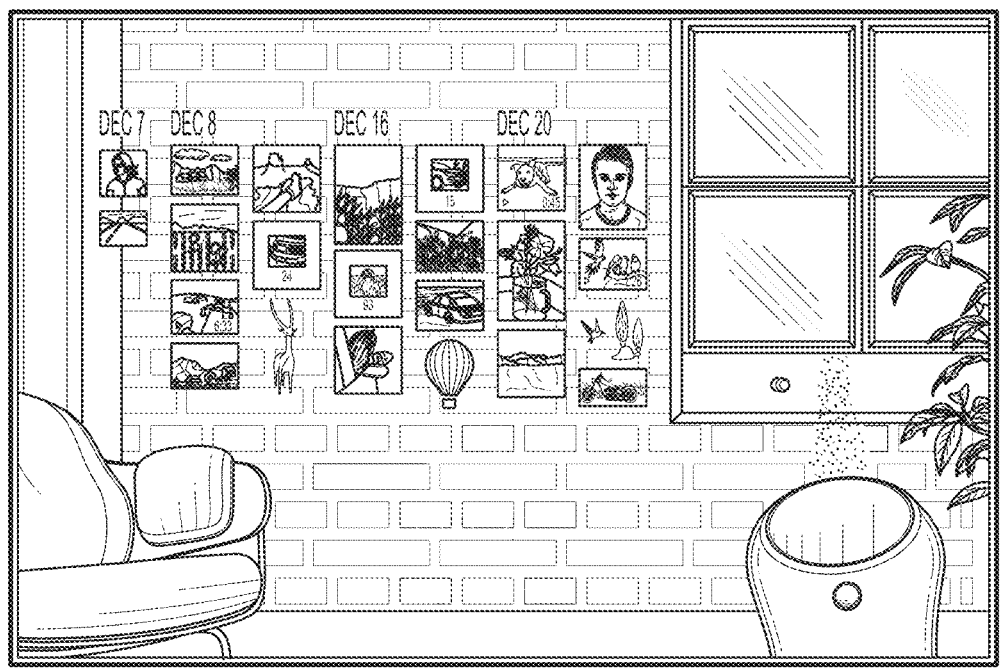
FIG. 13A2
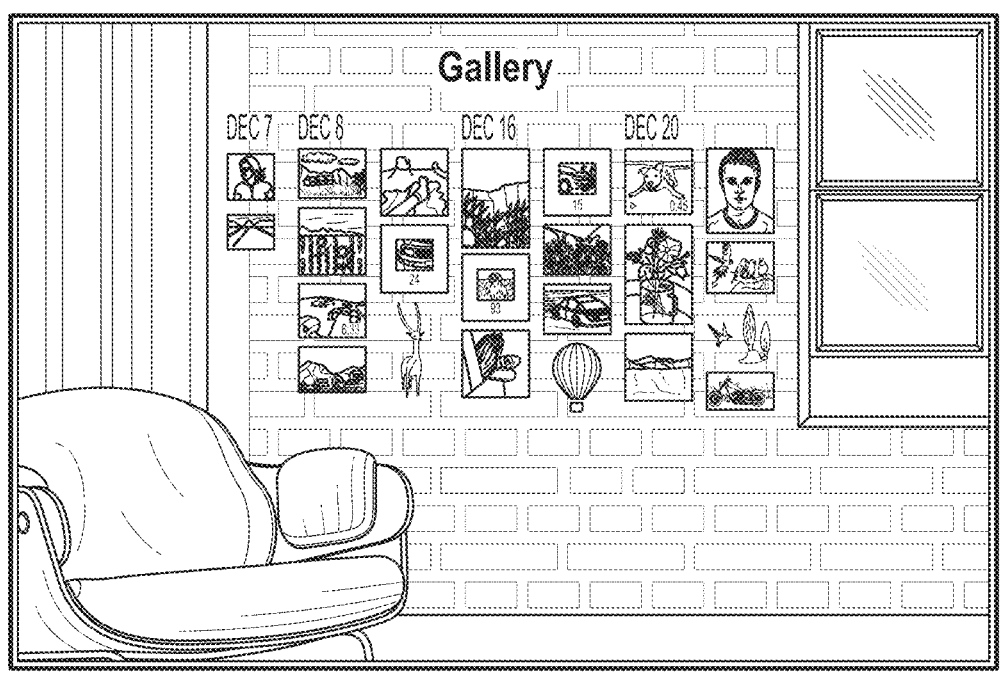
FIG. 13A3

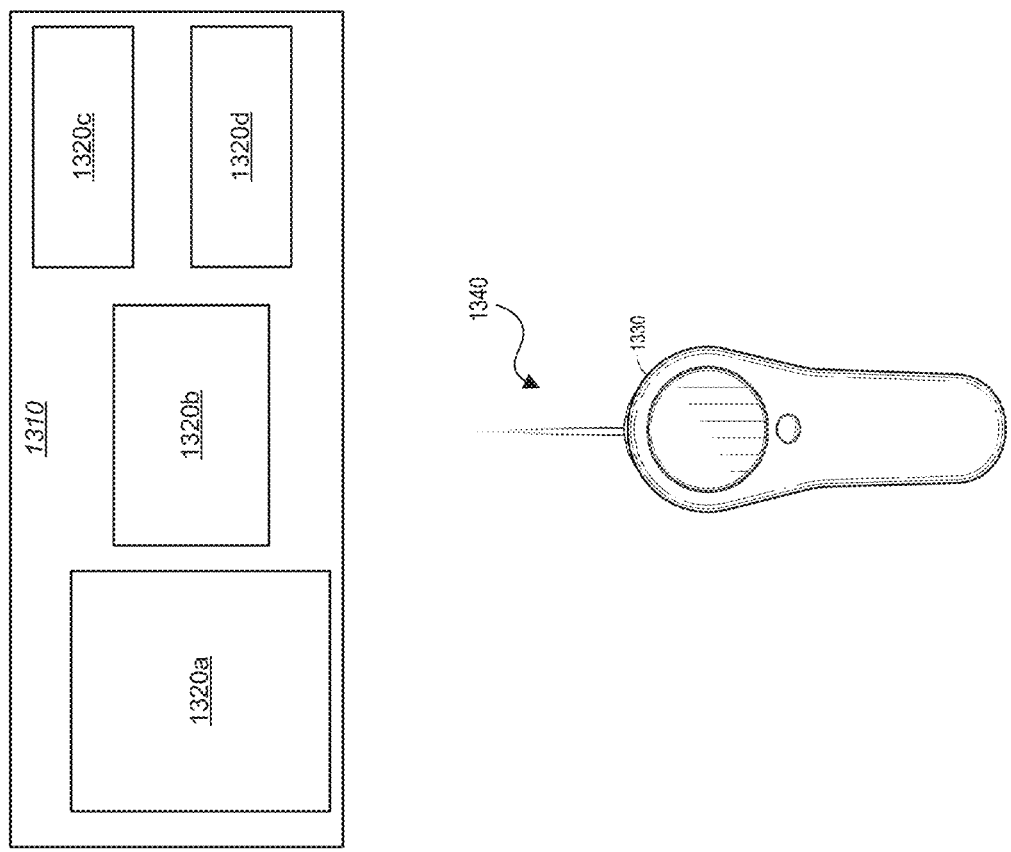

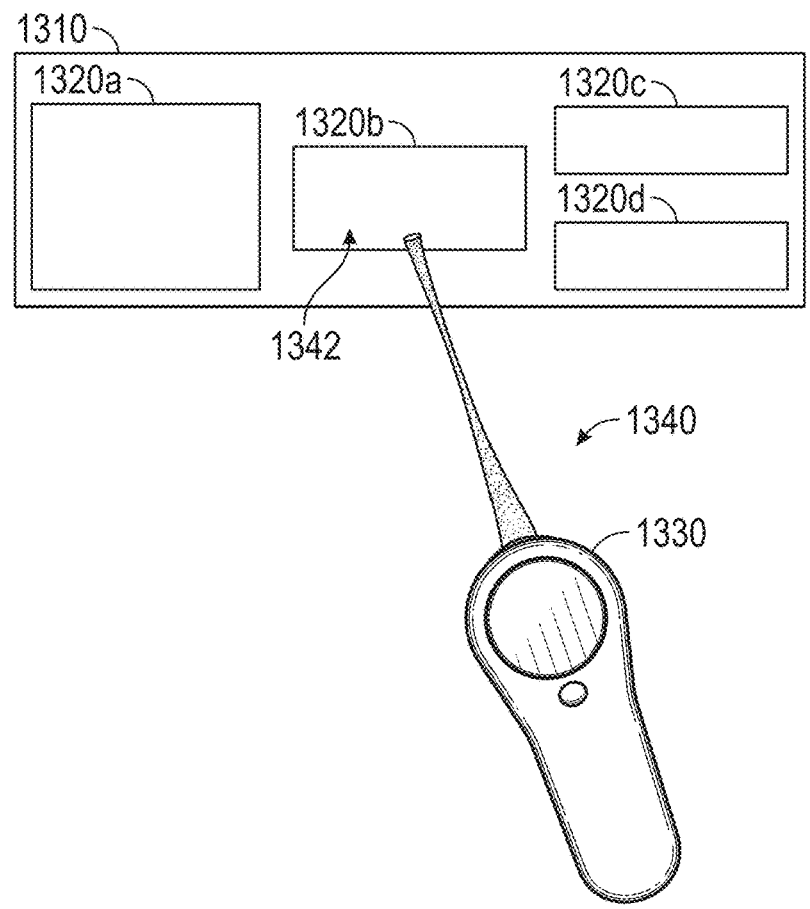
FIG. 13E1
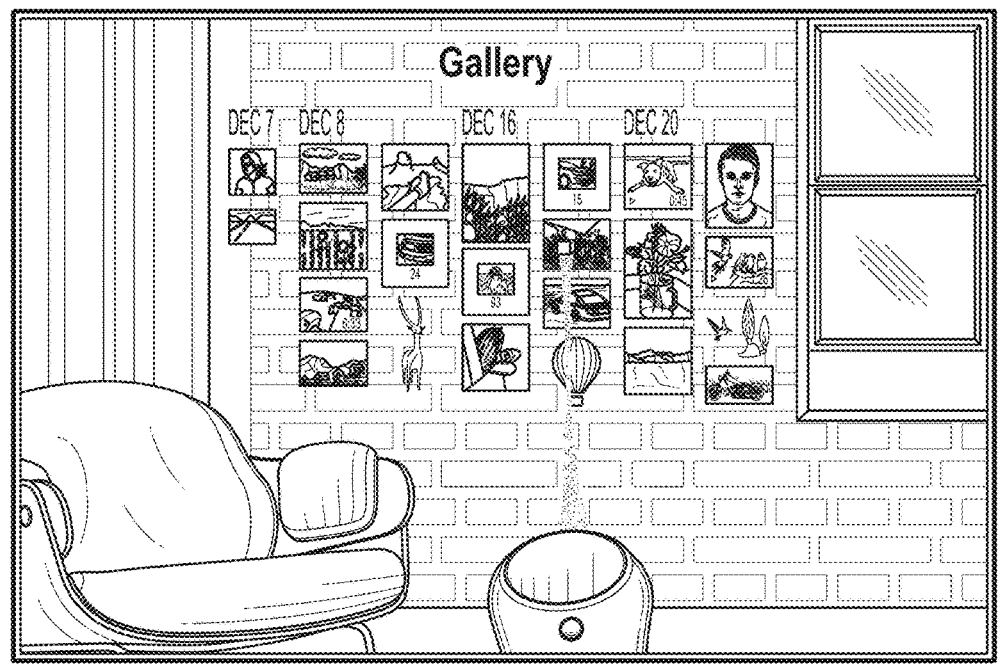
FIG. 13E2

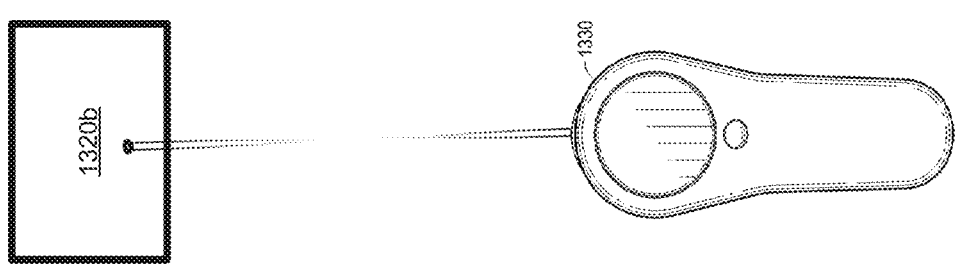
FIG. 13F4
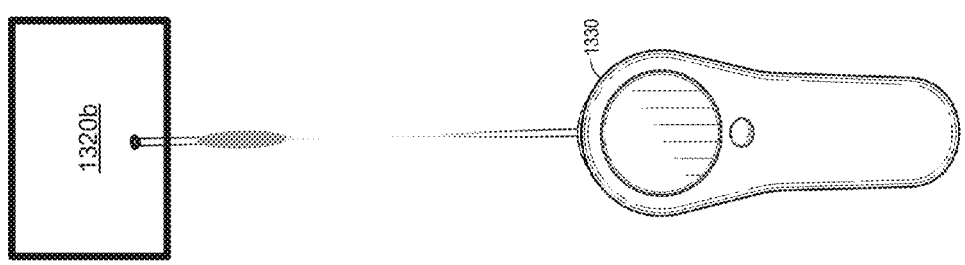
FIG. 13F3
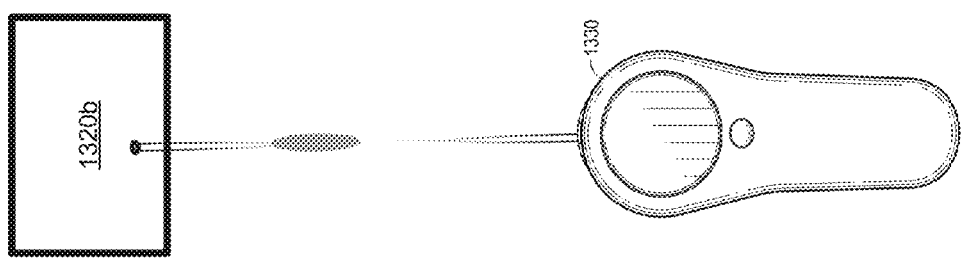
FIG. 13F2
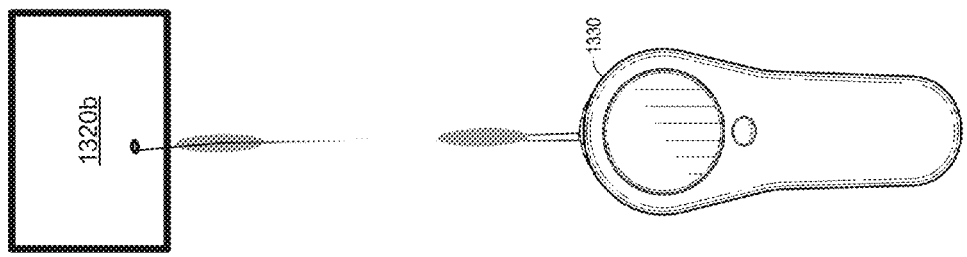
FIG. 13F1

MODES OF USER INTERACTION

FIELD

The present disclosure relates to virtual reality and augmented reality, including mixed reality, imaging and visualization systems and more particularly to systems and methods for displaying and interacting with virtual content.

BACKGROUND

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

SUMMARY

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 13A1 illustrates a controller in an idle state, such that the ray is in a shortened configuration.

FIG. 13A2 is an example rendering of a mixed reality view of a controller in the idle state, with the ray in a shortened configuration, and several virtual objects positioned on a back wall.

FIG. 13A3 is an example rendering of a mixed reality view of a prism, including the title "Gallery" that is displayed when the head pose intersects the prism.

FIGS. 13B-13D illustrate an example of the controller after it is moved such that the 6DoF cursor intersects with prism, causing the ray to extend towards and onto the prism.

FIG. 13E1 illustrates an activation cursor at the target end of the ray.

FIG. 13E2 is a rendering of the mixed reality view discussed above with ray in an active state.

FIG. 13F1 shows a darkening and glow added to the object outline, such as to indicate that the object is the subject of the users focus.

FIGS. 13F2, 13F3, and 13F4 illustrate three temporal snapshots of motons moving from the object (e.g., from the targeting end of the ray) towards the controller (e.g., towards the controller end of the ray).

Figure 1:
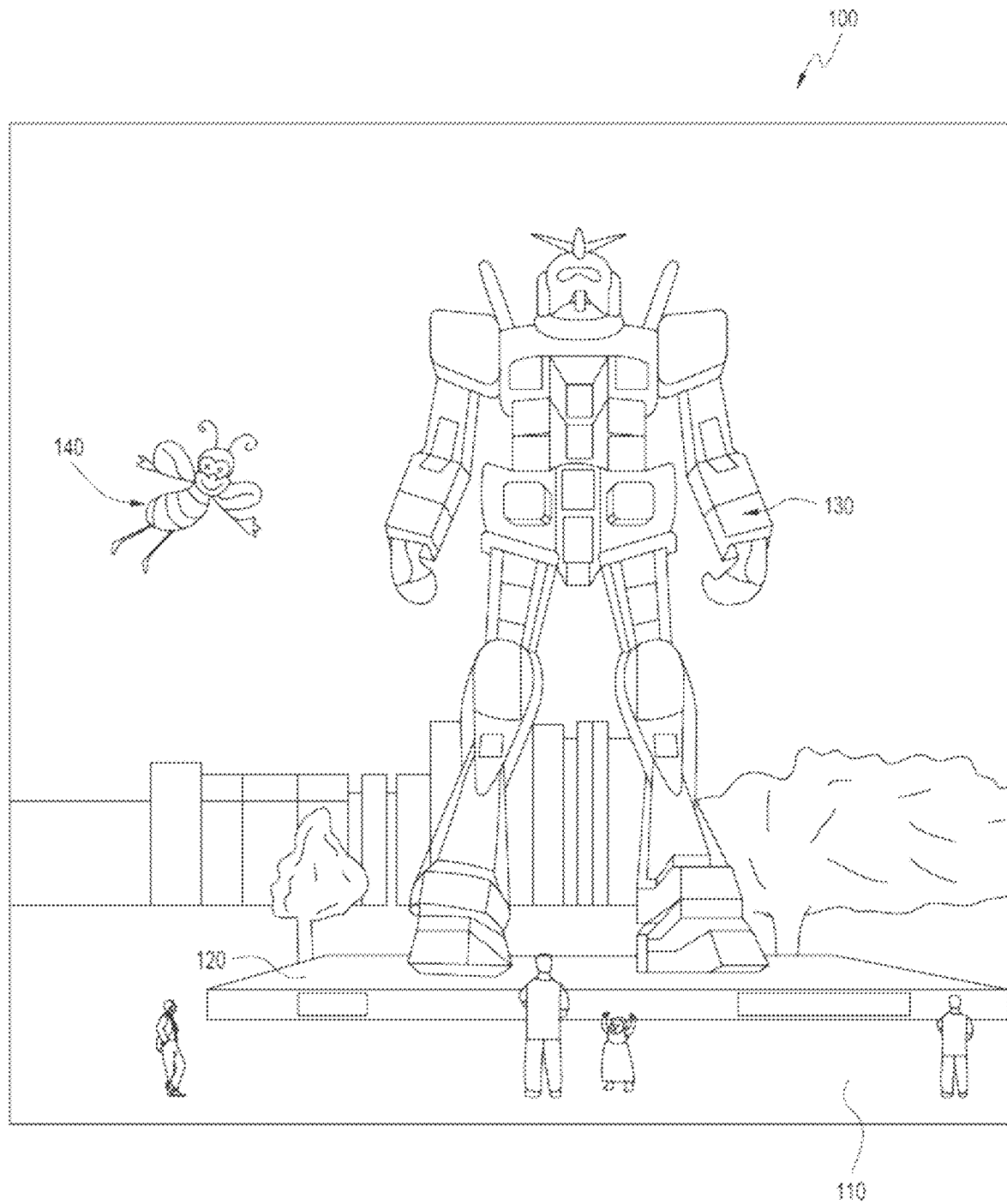
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example implementations described herein and are not intended to limit the scope of the disclosure.

DETAILED DESCRIPTION

Introduction

During a telepresence session in which two AR/VR/MR users are interacting with each other, a viewer can perceive an avatar of another user in the viewer's environment and thereby create a tangible sense of the other user's presence in the viewer's environment. The avatar can also provide a way for users to interact with each other and do things together in a shared virtual environment. For example, a student attending an online class can perceive and interact with avatars of other students or the teacher in a virtual classroom. As another example, a user playing a game in an AR/VR/MR environment may view and interact with avatars of other players in the game.

In some implementations, multiple users may wish to view a common virtual object. For example, a virtual object that is used for educational purposes, such as a piece of art in a museum, automobile, biological specimen, chemical compound, etc. may be selected by a presenter (e.g., a teacher of a class of students) for analysis, viewing, and/or interaction by multiple participants (e.g., students). As discussed further below, implementations that provide different viewing modes for such groups allow a user, such as a presenter, to customize the viewing experience of multiple participants. Such shared content experiences may make use of spatial computing by leveraging cinema techniques so that the virtual object can feel realistic and perceptually present in the room. This presentation tool may include animation, visual effects, and sound effects of scenes that are associated with portions of a virtual object (e.g., markings that are carved into the body of a statue) in spatial computing. Advantageously, use of different viewing modes allows individual users to see different virtual content despite being in a shared viewing space or alternatively, to see the same virtual content in different locations within a shared space.

Implementations of the disclosed systems and methods may provide for improved avatars and a more realistic interaction between a user of the wearable system and avatars in the user's environment. Although the examples in this disclosure describe animating a human-shaped avatar, similar techniques can also be applied to animals, fictitious creatures, objects, etc.

Terms

To facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms, wherein such construction is consistent with context of the term. Thus, the descriptions below do not limit the meaning of these terms, but only provide example descriptions.

Prism: container, area, or volume associated with mixed reality content. For example, a prism may contain multiple virtual content items that are selectable by a user. A prism may spawn when an application is launched, and then may spawn sibling or child prisms to create flexible layouts. An application within a prism may be configured to control where these hierarchical prisms will appear, which is typically within the proximity of the first prism and easily discoverable by a user.

A prism may provide feedback to a user. In some embodiments, the feedback may be a title that is only displayed to the user when the prism is targeted with headpose. In some embodiments, the feedback may be a glow around the prism. Prism glow (and/or other prism feedback) may also be used in sharing to give user feedback of which prisms are being shared.

Controller: a handheld controller, such as a totem.

Controller Axis: an axis extending from the controller defining a pointing direction of the controller.

Ray (or laser pointer): a virtual representation of the controller axis which may appear like a laser beam or similar light path that may be seen by a user wearing a headset. A ray may be diffused and appear light-based. A ray may fade towards the middle to make it less distracting and have less obstruction of content. A full ray (e.g., substantially constant width) may be shown when the ray intersects with a prism (or other content). A ray has a controller end that appears to extend from the controller and a target end that extends outward from the controller end along the controller axis.

Cursor: located at the target end of a ray, such as the target end that intersects with an object. The cursor may be a default or user-defined shape. In a multi-user mode, the cursor for each user may be customized.

Head pose: head position and/or head orientation that is determined using sensors such as inertial measurement units (IMUs), accelerometers, gyroscopes, etc. A head pose ray that extends in the direction of the head pose may be used to interact with virtual objects. For example, when a user is pointing or looking at a prism or an object, the object or prism is intersected by the user's head pose ray.

6dof (Six Degrees of Freedom) Cursor: the cursor when controlled by a 6DoF input device. A 6DoF cursor provides the ability to use the controller to freely move and rotate digital content in space based on input in six degrees of freedom. 6DoF motion may be tracked on three axes of translation and three axes of rotation. 6DoF tracking may use a multitude of sensors on both the controller and the wearable headset to enable tracking.

Touchpad Cursor: Controlling the cursor by swiping the touchpad of the Control to move the cursor relatively. The touchpad cursor may receive input from the controller in three degrees of freedom.

Focus: characteristic of an object, such as a prism, that allows interactive objects to be selected.

Input Focus: characteristic of an object, such as a prism or application, that causes the object's cursor to be refreshed and rendered as the active system cursor. In some implementations, there can be multiple focus objects but only one with input focus.

Prism Selection (or Prism Activation): The prism that is currently being interacted with by the user. This prism may not have prism focus, but could be the only prism receiving input. Applications receive events to indicate when they are selected or deselected, and they can update their interface to indicate this state. When a prism is receiving input but not focused, that's considered Super Activation.

Prism Focus: The prism that is currently being looked at with head pose or pointed at with the controller. This prism may not have input focus or selection yet.

Prism Super Activation: A state of a prism where input focus is retained much more often while the prism is also selected. A prism requests this state by setting a prism property, and it is typically associated with an active Text Edit UI/keyboard.

Input Focus: The prism (or application) that is currently receiving input events from the user. Typically, an application only receives inputs when it is targeted by the active cursor (e.g., the controller or touchpad cursor).

Focus Group: A group of prisms that are considered in a block for Prism Focus and Prism Selection. In some implementations, the user is able to pick which group is being selected or focused using the normal rules, but the application developer is then allowed to change which prism within the focus group is currently the target of focus and selection. This may be used for Keyboard, for example, to migrate input between keyboard and host prism as needed.

Focus Group Target: The current prism within its focus group that is the target of input and selection.

Input Foreground App: The app that is currently receiving input events.

Back (Home) Button: The button on the controller, keyboard, or other input device, that operates as a back button. In some implementations, the selected prism gets first dibs at capturing this event, but if it doesn't, the system may deselect the prism.

Examples of 3D Display of a Wearable System

A wearable system (also referred to herein as an augmented reality (AR) system), such as the example discussed below with reference to FIG. 2, can be configured to present 2D or 3D images of virtual objects to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR environment 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a flying cartoon-like avatar character 140 that seems to be a personification of a bumble bee, even though these elements do not exist in the real world.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth planes or based on observing different image features on different depth planes being out of focus. As discussed elsewhere herein, such depth cues provide credible perceptions of depth.

Figure 2:
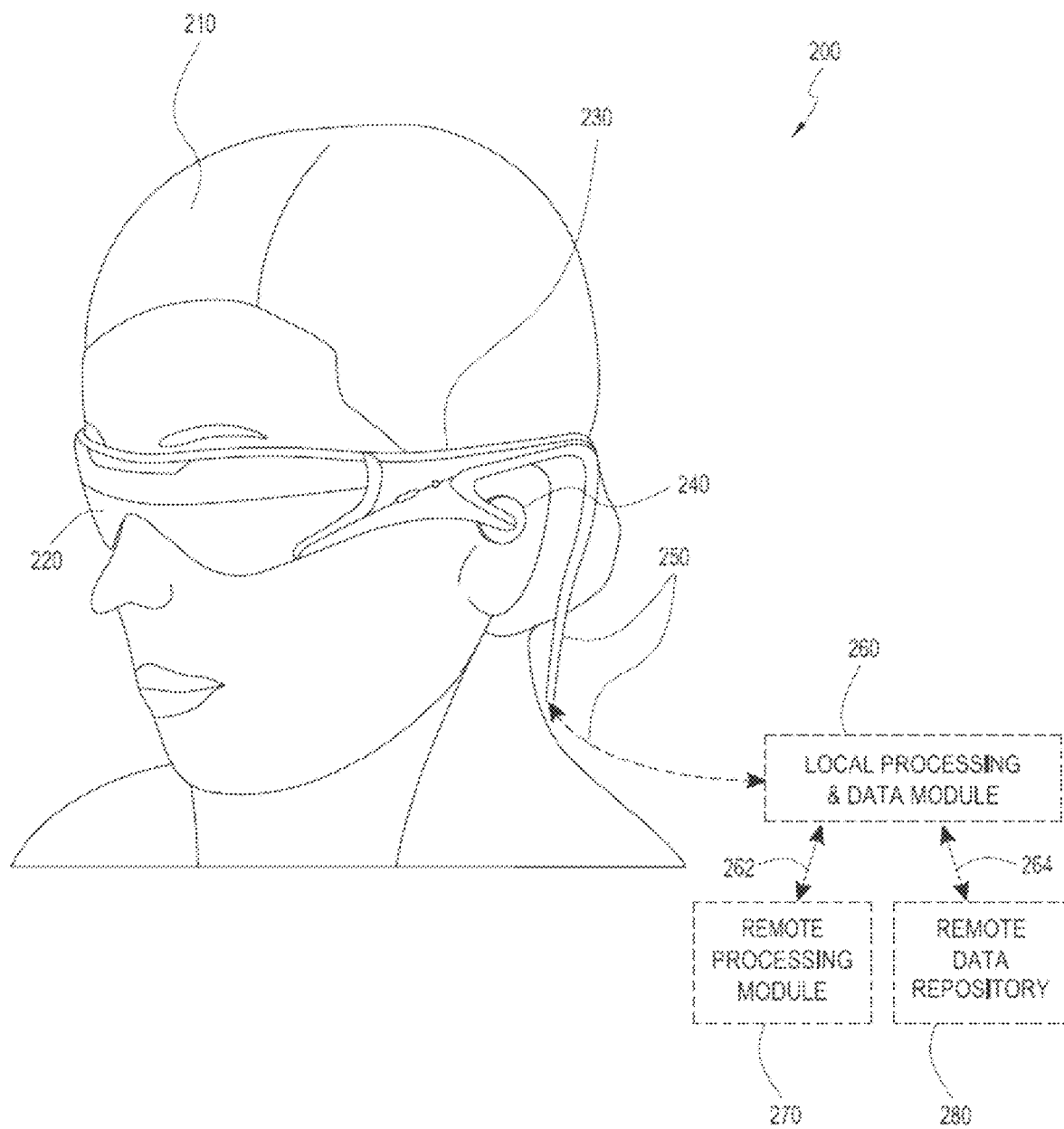
FIG. 2 schematically illustrates an example of a wearable system.

FIG. 2 illustrates an example of wearable system 200 which can be configured to provide an AR/VR/MR scene. The wearable system 200 can also be referred to as the AR system 200 or the wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some implementations, a speaker 240 is coupled to the frame 230 and positioned adjacent the ear canal of the user (in some implementations, another speaker, not shown, is positioned adjacent the other ear canal of the user to provide for stereo/shapeable sound control). The display 220 can include an audio sensor (e.g., a microphone) for detecting an audio stream from the environment and/or capture ambient sound. In some implementations, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 and/or 270, which may process image information acquired by the inward-facing imaging system to determine, e.g., the pupil diameters or orientations of the eyes, eye movements or eye pose of the user 210. The inward-facing imaging system 462 may include one or more cameras or other imaging devices. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and/or storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 270 and remote data repository 280 may be operatively coupled to each other.

In some implementations, the remote processing module 270 may comprise one or more processors configured to analyze and process data or image information. In some implementations, the remote data repository 280 may comprise a digital data storage facility, which may be available through the internet or other networking configuration in a "cloud" resource configuration. In some implementations, all data is stored and all computations (e.g., AR processes discussed herein) are performed in the local processing and data module, allowing fully autonomous use from a remote module. In other implementations, some or all of the computations of certain AR processes discussed herein are performed remotely, such as at a network-connected server.

Example Components of a Wearable System

Figure 3:
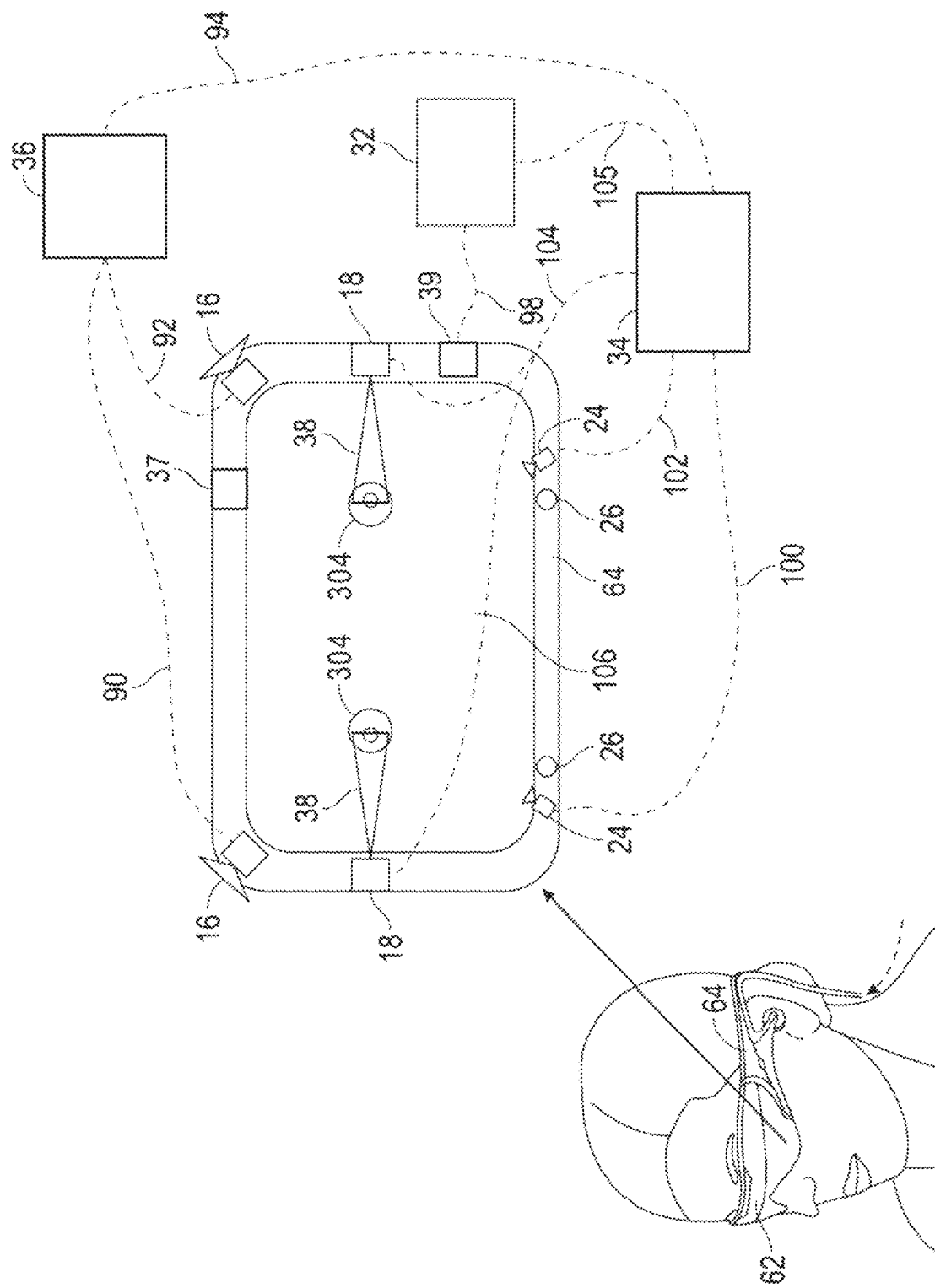
FIG. 3 schematically illustrates example components of a wearable system.

FIG. 3 schematically illustrates example components of a wearable system. FIG. 3 shows the wearable system 200, including the display 220 and the frame 230. A blown-up view 202 schematically illustrates various components of the wearable system 200. In certain implementations, one or more of the components illustrated in FIG. 3 can be part of the display 220. The various components alone or in combination can collect a variety of data (such as e.g., audio or visual data) associated with the user of the wearable system 200 or the user's environment. In other implementations, a wearable system may include additional or fewer components depending on the application for which the wearable system is used. Nevertheless, FIG. 3 provides a basic idea of some of the various components and types of data that may be collected, analyzed, and stored through the wearable system.

In the example of FIG. 3, the display 220 can comprise a display lens 226 that may be mounted to a user's head or a housing or the frame 230. The display lens 226 may comprise one or more transparent mirrors positioned by the frame 230 in front of the user's eyes 302, 304 and may be configured to bounce projected light 38 into the eyes 302, 304 and facilitate beam shaping, while also allowing for transmission of at least some light from the local environment. The wavefront of the projected light beam 38 may be bent or focused to coincide with a desired focal distance of the projected light. As illustrated, two wide-field-of-view machine vision cameras 16 (also referred to as world cameras) can be coupled to the frame 230 to image the environment around the user. These world cameras 16 can be dual capture visible light/non-visible (e.g., infrared) light cameras. The cameras 316 may be part of the outward-facing imaging system 464 shown in FIG. 4. Images acquired by the world cameras 16 can be processed by the pose processor 36. For example, the pose processor 36 can implement one or more object recognizers 708 (e.g., shown in FIG. 7) to identify a pose of a user or another person in the user's environment or to identify a physical object in the user's environment.

The pose processor 36 may include one or more processors, such as an ASIC (application specific integrated circuit), FPGA (field programmable gate array), or ARM processor (advanced reduced-instruction-set machine), which may be configured to calculate real or near-real time user head pose from wide field of view image information output from the world cameras 16. The head pose processor 36 can be a hardware processor and can be implemented as part of the local processing and data module 260 shown in FIG. 2.

With continued reference to FIG. 3, a pair of scanned-laser shaped-wavefront (e.g., for depth) light projector modules 18 with display mirrors and optics configured to project light 38 into the eyes 302, 304 are shown. The depicted view also shows two miniature infrared cameras 24 paired with infrared light (such as light emitting diodes "LED"s), which are configured to be able to track the eyes 302, 304 of the user to support rendering and user input. The cameras 24 may be part of the inward-facing imaging system 462 shown in FIG. 4.

The wearable system 200 can further feature a sensor assembly 39, which may comprise X, Y, and Z axis accelerometer capability and/or a magnetic compass and X, Y, and Z axis gyro capability, preferably providing data at a relatively high frequency, such as 200 Hz or more. The sensor assembly 39 may be part of the IMU described with reference to FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, and/or a depth sensing camera. In certain implementations, where the cameras 316 have depth sensing ability, the cameras 16 may also be considered as depth sensors 234.

In the example of FIG. 3, a sensor pose processor 32 is configured to execute digital and/or analog processing to derive pose from the gyro, compass, and/or accelerometer data from the sensor assembly 39. The sensor pose processor 32 may be part of the local processing and data module 260 shown in FIG. 2.

The wearable system 200 as shown in FIG. 3 can also include a position system such as, e.g., a GPS 37 (global positioning system) to assist with pose and positioning analyses. In addition, the GPS may further provide remotely-based (e.g., cloud-based) information about the user's environment. This information may be used for recognizing objects or information in the user's environment.

The wearable system may combine data acquired by the GPS 37 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 16 (which may be part of the outward-facing imaging system 464 shown in FIG. 4). Based on the images acquired by the world cameras 16, the wearable system 200 can detect objects in the environment (e.g., by using one or more object recognizers 708 shown in FIG. 7). The wearable system can further use data acquired by the GPS 37 to interpret the detected objects, e.g., such as to determine that an object is associated with a character.

The wearable system 200 may also comprise a rendering engine 34 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some implementations, the rendering engine is part of the local processing and data module 260. The rendering engine 34 can be communicatively coupled (e.g., via wired or wireless links) to other components of the wearable system 200. For example, the rendering engine 34, can be coupled to the eye cameras 24 via communication link 274, and/or be coupled to a projecting subsystem 18 (which can project light into user's eyes 302, 304 via a scanned laser arrangement in a manner similar to a retinal scanning display) via the communication link 272. The rendering engine 34 can also be in communication with other processing units such as, e.g., the sensor pose processor 32 and the image pose processor 36 via links 105 and 94 respectively.

The cameras 24 (e.g., mini infrared cameras) may be utilized to track the eye pose to support rendering and user input. Some example eye poses may include where the user is looking or at what depth he or she is focusing (e.g., which may be estimated with eye vergence). The GPS 37, gyros, compass, and/or accelerometers may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some implementations may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 36, sensor pose processor 32, and rendering engine 34 may be positioned in a beltpack and configured to communicate with other components of the wearable system via wireless communication, such as ultra-wideband, Wi-Fi, Bluetooth, etc., or via wired communication. The depicted frame 230 preferably is head-mountable and wearable by the user. However, some components of the wearable system 200 may be worn on other portions of the user's body. For example, the speaker 240 may be inserted into, and/or positioned near, the ears of a user to provide sound to the user.

Regarding the projection of light 38 into the eyes 302, 304 of the user, in some implementations, the cameras 24 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

Spatially coherent light with a beam diameter of less than about 0.7 millimeters can typically be correctly resolved by the human eye regardless of where the eye focuses. Thus, to create an illusion of proper focal depth, the eye vergence may be tracked with the cameras 24, and the rendering engine 34 and projection subsystem 18 may be utilized to render all objects on or close to the horopter in focus, and all other objects at varying degrees of defocus (e.g., using intentionally-created blurring). In one implementation, the display 220 renders to the user at a frame rate of about 60 frames per second or greater. As described above, the cameras 24 may be utilized for eye tracking, and software may be configured to pick up not only vergence geometry but also focus location cues to serve as user inputs. Such a display system may be configured with brightness and contrast suitable for day or night use.

In some implementations, the display system has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the wearable system to know where it is with respect to the real world).

In some implementations, the wearable system 200 is configured to display one or more images of virtual objects (also referred to as "virtual images" herein) based on the accommodation of the user's eyes. Unlike prior 3D display approaches that force the user to focus where the images are being projected, in some implementations, the wearable system is configured to automatically vary the focus of projected virtual content to allow for a more comfortable viewing of one or more images presented to the user. For example, if the user's eyes have a current focus of 1 meter, the image may be projected to coincide with the user's focus. If the user shifts focus to 3 meters, the image is projected to coincide with the new focus. Thus, rather than forcing the user to a predetermined focus, the wearable system 200 of some implementations allows the user's eye to a function in a more natural manner.

Such a wearable system 200 may eliminate or reduce the incidences of eye strain, headaches, and/or other physiological symptoms typically observed with respect to virtual reality devices. To achieve this, various implementations of the wearable system 200 are configured to project virtual images at varying focal distances, through one or more variable focus elements (VFEs). In one or more implementations, 3D perception may be achieved through a multi-plane focus system that projects images at fixed focal planes away from the user. Other implementations employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In some implementations, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some implementations, a spatial light modulator may project the images to the user through various optical components. For example, as described further below, the spatial light modulator may project the images onto one or more waveguides, which then transmit the images to the user.

Example Waveguide Stack Assembly

Figure 4:
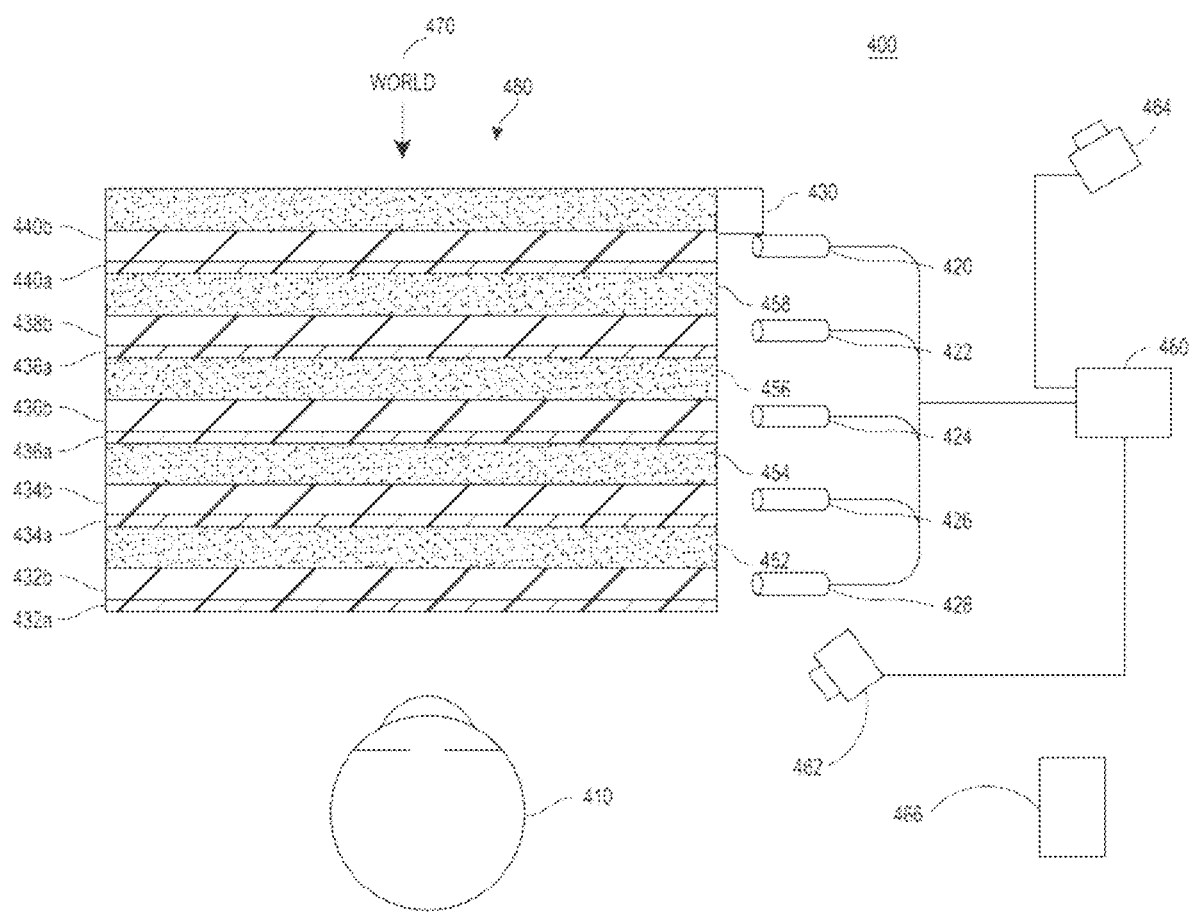
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 440b. In some implementations, the wearable system 400 may correspond to wearable system 200 of FIG. 2, with FIG. 4 schematically showing some parts of the wearable system 200 in greater detail and not showing certain other components. For example, in some implementations, the waveguide assembly 480 may be integrated into the display 220 of FIG. 2.

With continued reference to FIG. 4, the waveguide assembly 480 may also include a plurality of features 458, 456, 454, 452 between the waveguides. In some implementations, the features 458, 456, 454, 452 may be lenses. In other implementations, the features 458, 456, 454, 452 may not be lenses. Rather, they may simply be spacers (e.g., cladding layers or structures for forming air gaps).

The waveguides 432b, 434b, 436b, 438b, 440b and/or the plurality of lenses 458, 456, 454, 452 may be configured to send image information to the eye with various levels of wavefront curvature or light ray divergence. Positions of the waveguides (e.g., from the eye 410) may be associated with different depth planes and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across the respective waveguide, for output toward the eye 410. In this example, light exits an output surface of the image injection devices 420, 422, 424, 426, 428 and is injected into a corresponding input edge of the waveguides 440b, 438b, 436b, 434b, 432b. In some implementations, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some implementations, the image injection devices 420, 422, 424, 426, 428 are discrete displays that each produce image information for injection into a corresponding waveguide 440b, 438b, 436b, 434b, 432b, respectively. In some implementations, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some implementations, the controller 460 may be a single integral device, or a distributed system connected by wired or wireless communication channels. The controller 460 may be part of the processing modules 260 or 270 (illustrated in FIG. 2) in some implementations.

The waveguides 440b, 438b, 436b, 434b, 432b may be configured to propagate light within each respective waveguide by total internal reflection (TIR). The waveguides 440b, 438b, 436b, 434b, 432b may be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some implementations, the light extracting optical elements 440a, 438a, 436a, 434a, 432a may be disposed at the top or bottom major surfaces, or may be disposed directly in the volume of the waveguides 440b, 438b, 436b, 434b, 432b. In some implementations, the light extracting optical elements 440a, 438a, 436a, 434a, 432a may be formed in a layer of material that is attached to a transparent substrate to form the waveguides 440b, 438b, 436b, 434b, 432b. In some implementations, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to the example of FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative implementations, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some implementations, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some implementations, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some implementations, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some implementations, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some implementations, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an implementation of the local processing and data module 260) can be configured or programmed to cease providing image information to one of these waveguides. Advantageously, this may reduce the processing burden on the system, thereby increasing the responsiveness of the system. In implementations in which the DOEs for a waveguide are switchable between the on and off states, the DOEs may be switched to the off state when the waveguide does receive image information.

In some implementations, it may be desirable to have an exit beam meet the condition of having a diameter that is less than the diameter of the eye of a viewer. However, meeting this condition may be challenging in view of the variability in size of the viewer's pupils. In some implementations, this condition is met over a wide range of pupil sizes by varying the size of the exit beam in response to determinations of the size of the viewer's pupil. For example, as the pupil size decreases, the size of the exit beam may also decrease. In some implementations, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the FOV of the viewer 210 of the wearable system 400. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor, e.g., a microphone, to capture ambient sound. As described above, in some implementations, one or more other audio sensors can be positioned to provide stereo sound reception useful to the determination of location of a speech source. The audio sensor can comprise a directional microphone, as another example, which can also provide such useful directional information as to where the audio source is located. The wearable system 400 can use information from both the outward-facing imaging system 464 and the audio sensor in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 462 (e.g., a digital camera), which observes the movements of the user, such as the eye movements and the facial movements. The inward-facing imaging system 462 may be used to capture images of the eye 410 to determine the size and/or orientation of the pupil of the eye 304. The inward-facing imaging system 462 can be used to obtain images for use in determining the direction the user is looking (e.g., eye pose) or for biometric identification of the user (e.g., via iris identification). In some implementations, at least one camera may be utilized for each eye, to separately determine the pupil size or eye pose of each eye independently, thereby allowing the presentation of image information to each eye to be dynamically tailored to that eye. In some other implementations, the pupil diameter or orientation of only a single eye 410 (e.g., using only a single camera per pair of eyes) is determined and assumed to be similar for both eyes of the user. The images obtained by the inward-facing imaging system 462 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a handheld controller or totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as controllers or totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an implementation of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with A Wearable System

Figure 5:
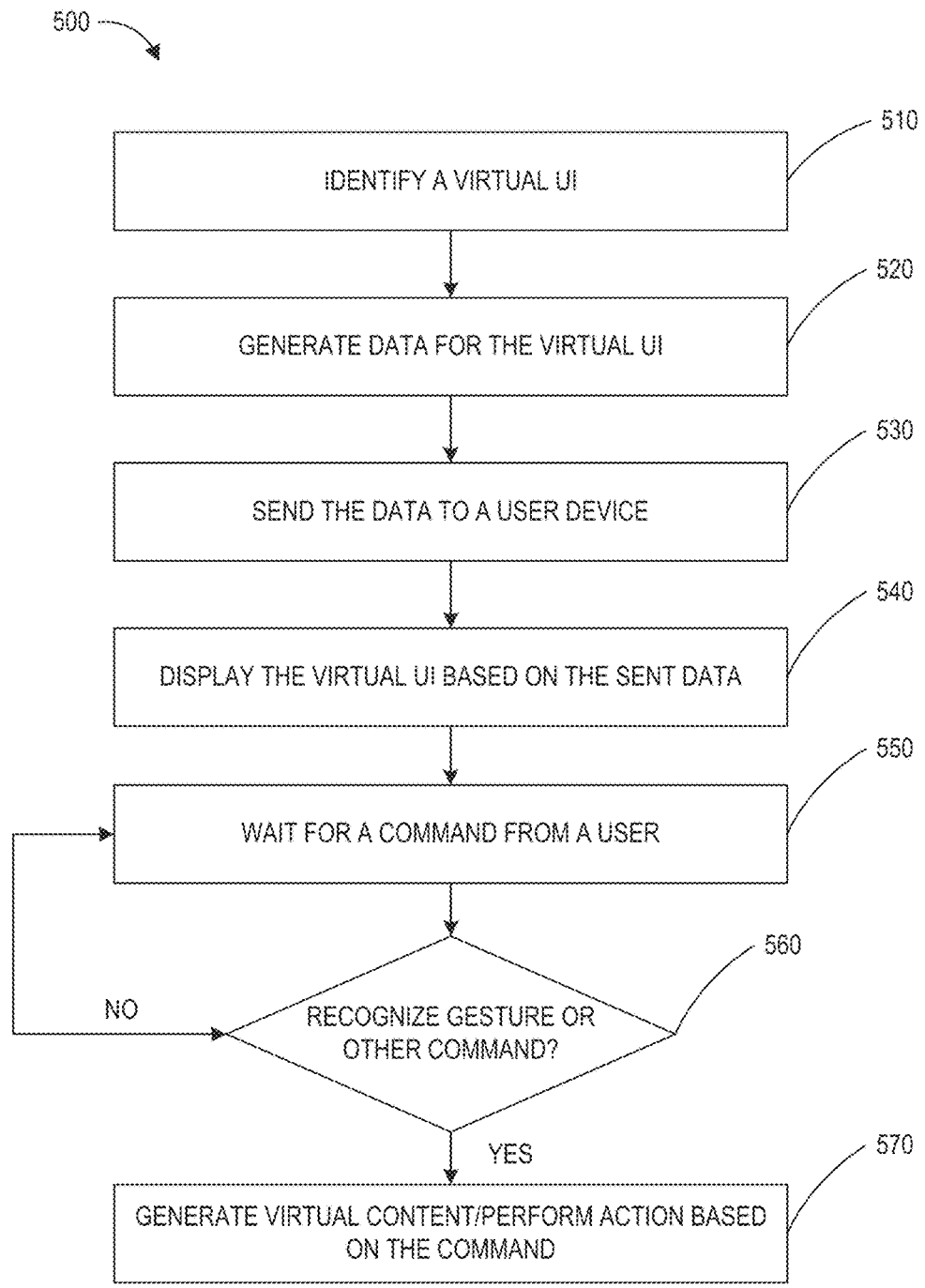
FIG. 5 is a flowchart illustrating an example process of interacting with a virtual user interface.

FIG. 5 is a process flow diagram of an example of a method 500 for interacting with a virtual user interface. The method 500 may be performed by the wearable system described herein. Implementations of the method 500 can be used by the wearable system to detect persons or documents in the FOV of the wearable system.

At block 510, the wearable system may identify a particular UI. The type of UI may be predetermined by the user.

The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
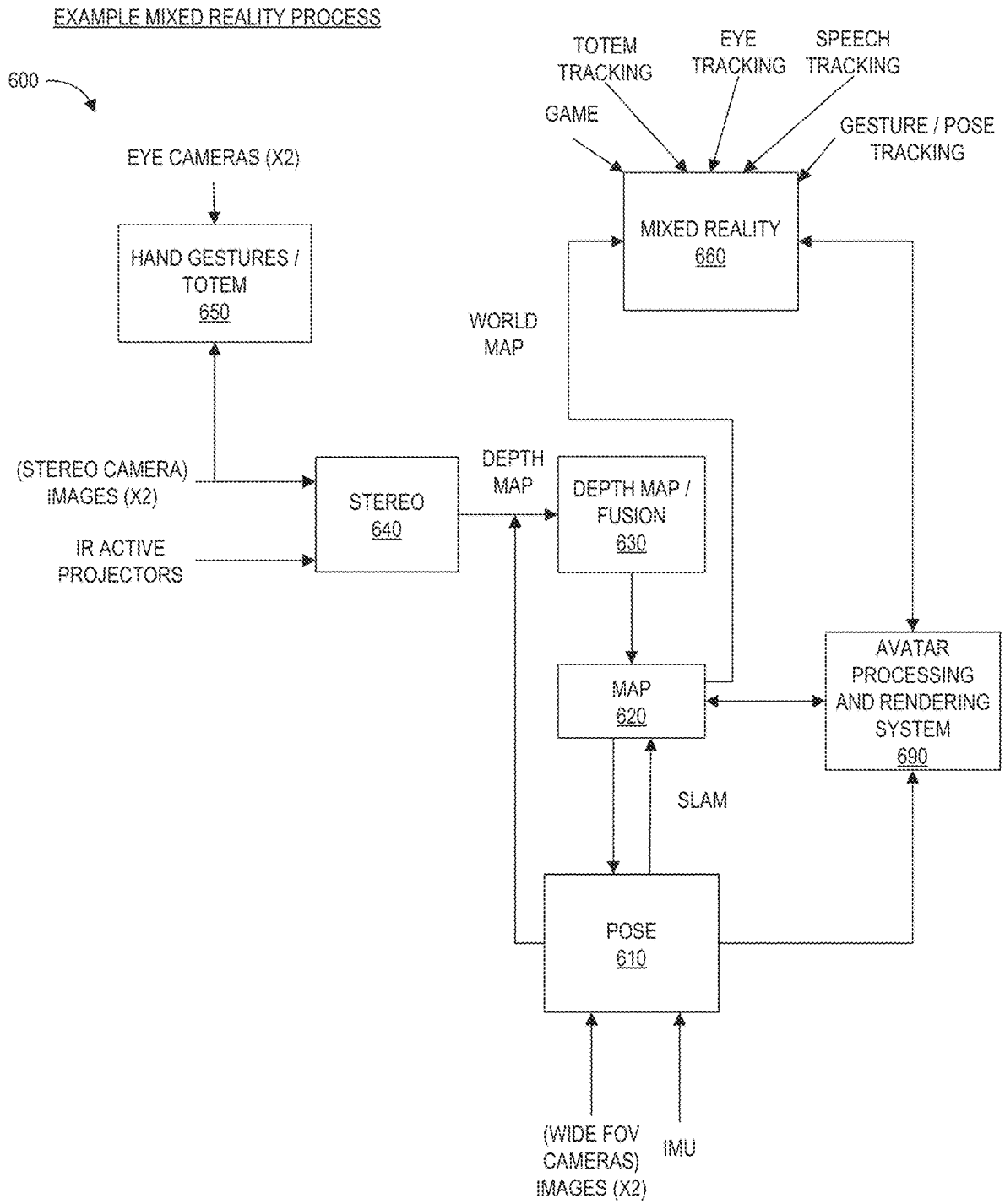
FIG. 6A is a block diagram of another example of a wearable system which can comprise an avatar processing and rendering system.

FIG. 6A is a block diagram of another example of a wearable system which can comprise an avatar processing and rendering system 690 in a mixed reality environment. The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one implementation, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the implementation depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one implementation, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one implementation, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 260 or the remote processing module 270 alone or in combination. In various implementations, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network, for example, as will be described with reference to FIG. 9.

Figure 6B:
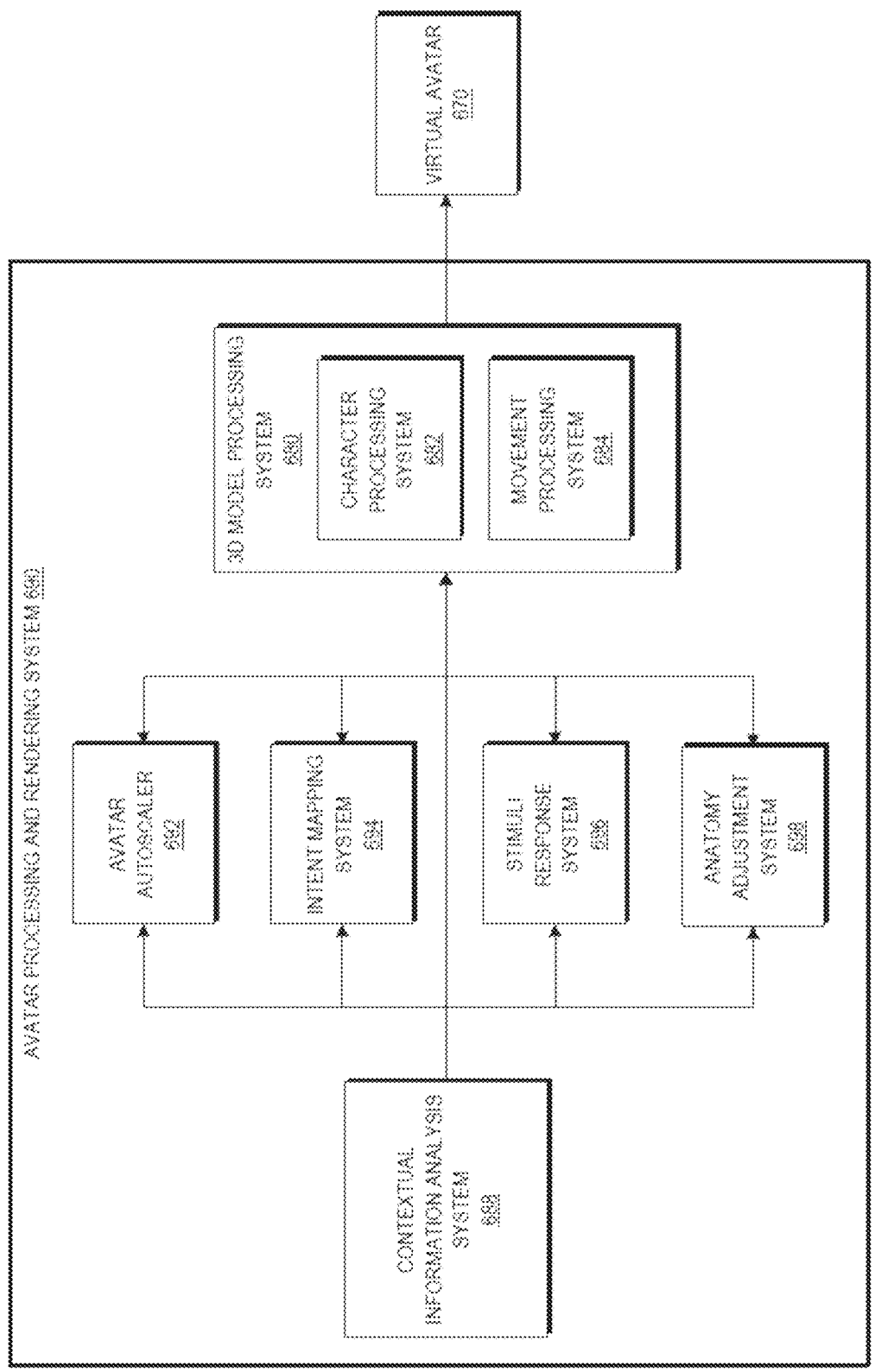
FIG. 6B is a block diagram illustrating example components of an avatar processing and rendering system.

FIG. 6B illustrates an example avatar processing and rendering system 690. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images acquired by the outward-facing imaging system 464 of the user or the viewer of the user's avatar. The contextual information analysis system 688 can analyze such images alone or in combination with a data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the user's avatar's body (e.g., the head) is not at an uncomfortable (or unrealistic) position with respect to the other portions of the user's body (e.g., the avatar's head is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session. Typically, two people face each other when communicating. The intent mapping system 694 of the first user's wearable system can determine that such a face-to-face intent exists during the telepresence session and can cause the first user's wearable system to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the avatar's pose, by moving the avatar around in a user's environment, or by animating the avatar's facial expressions, etc. As will further be described herein, the virtual avatar can be animated using rigging techniques. In some implementations, an avatar is represented in two parts: a surface representation (e.g., a deformable mesh) that is used to render the outward appearance of the virtual avatar and a hierarchical set of interconnected joints (e.g., a core skeleton) for animating the mesh. In some implementations, the virtual character processing system 682 can be configured to edit or generate surface representations, while the movement processing system 684 can be used to animate the avatar by moving the avatar, deforming the mesh, etc.

Examples of Mapping a User's Environment

Figure 7:
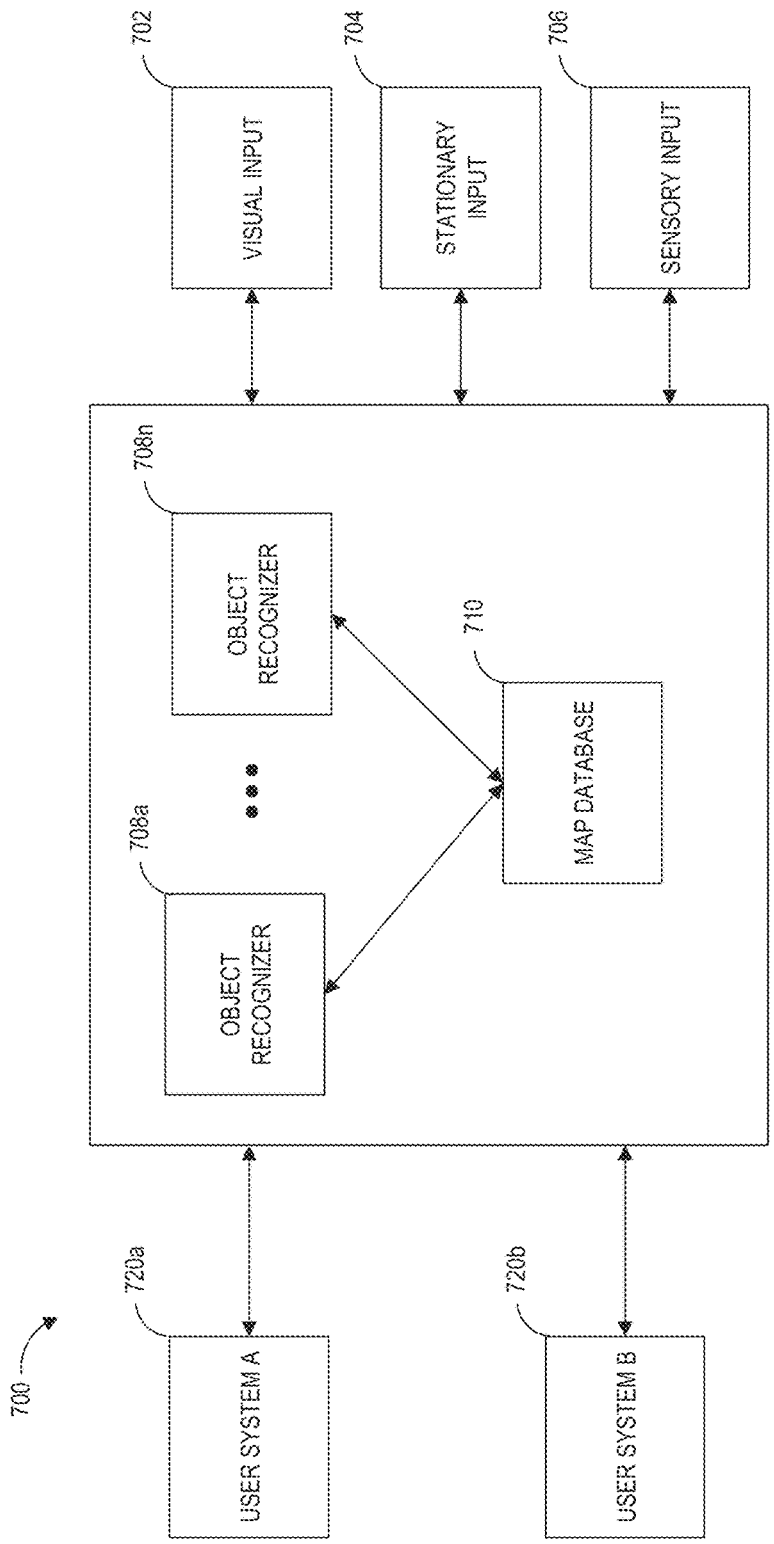
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some implementations, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some implementations, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
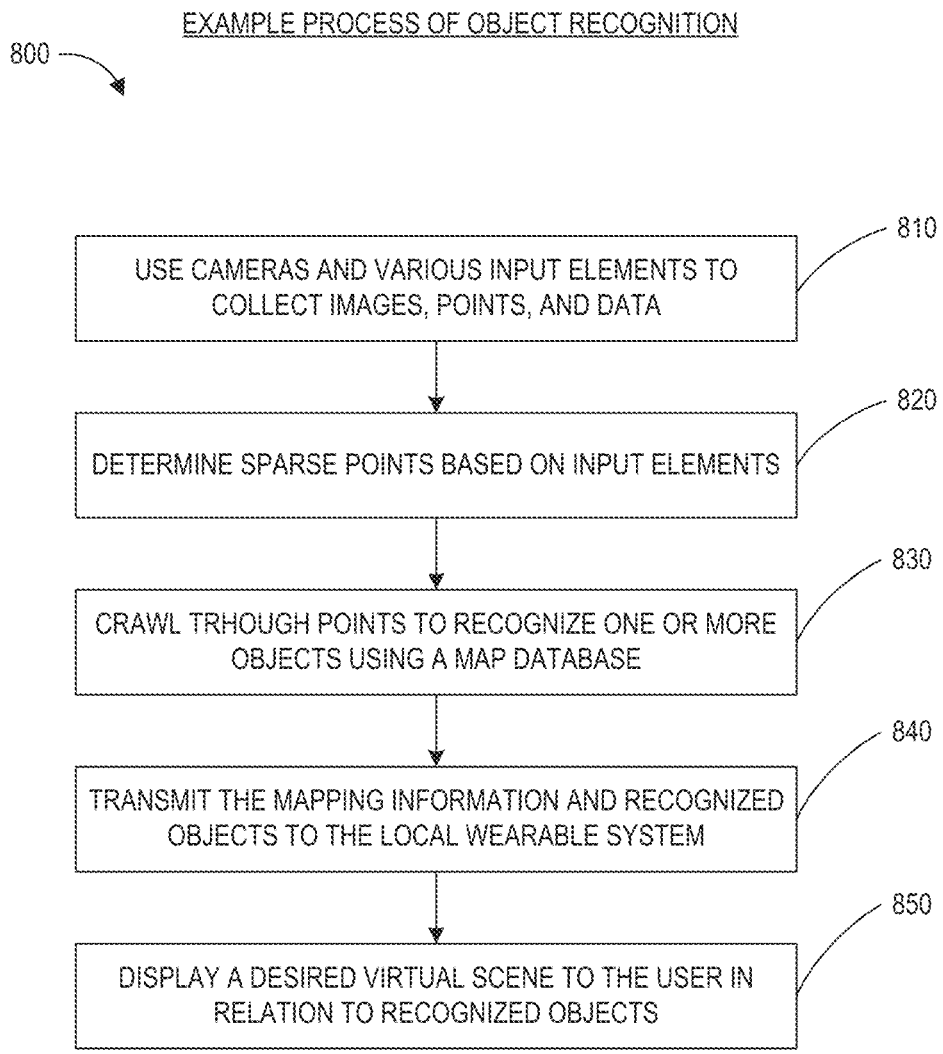
FIG. 8 is a flowchart illustrating an example process of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications Among Multiple Wearable Systems

Figure 9:
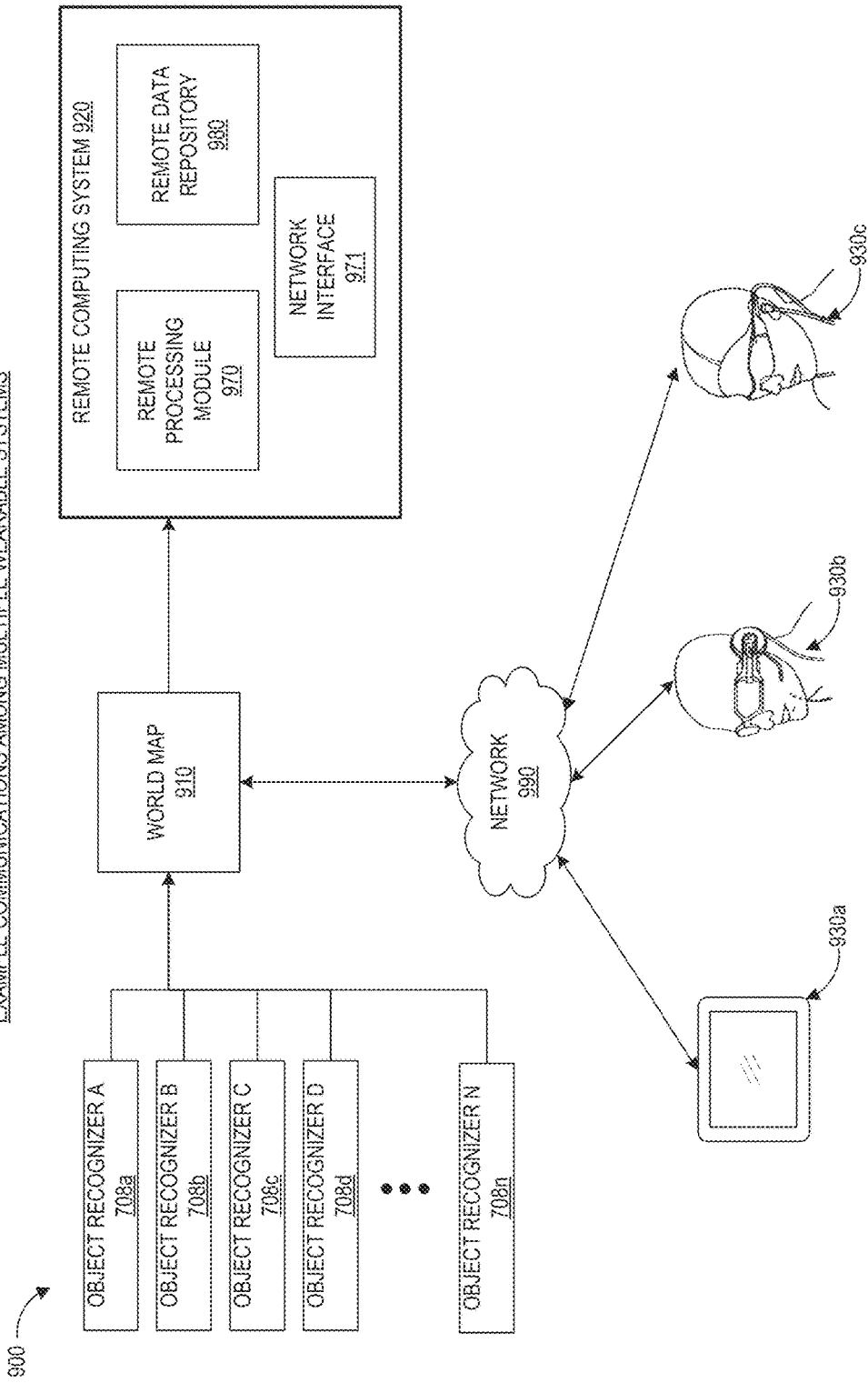
FIG. 9 schematically illustrates components of a system that coordinates interactions between multiple wearable systems.

FIG. 9 schematically illustrates an overall system view depicting multiple user devices interacting with each other. The computing environment 900 includes user devices 930a, 930b, 930c. The user devices 930a, 930b, and 930c can communicate with each other through a network 990.

The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an implementation of the remote data repository 280 shown in FIG. 2. The remote computing system 920 may also include a remote processing module 970. The remote processing module 970 may be an implementation of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930b and 930c may be an implementation of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 920 (FIG. 9) can construct, update, and build a collection of images, points and other information using the information obtained from the user devices. For example, the user device may process raw information acquired and send the processed information to the remote computing system 920 for further processing. The user device may also send the raw information to the remote computing system 920 for processing. The user device may receive the processed information from the remote computing system 920 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708a, 708b, 708c . . . 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g. 930a, 930b, 930c) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g. 930a, 930b, 930c) to process information about the user and the user's environment. The remote computing system 920 can modify the information acquired by the user devices (e.g. 930a, 930b, 930c), such as, e.g. selectively cropping a user's image, modifying the user's background, adding virtual objects to the user's environment, annotating a user's speech with auxiliary information, etc. The remote computing system 920 can send the processed information to the same and/or different user devices.

Example Handheld Controller (or "Totem")

Figure 10A:
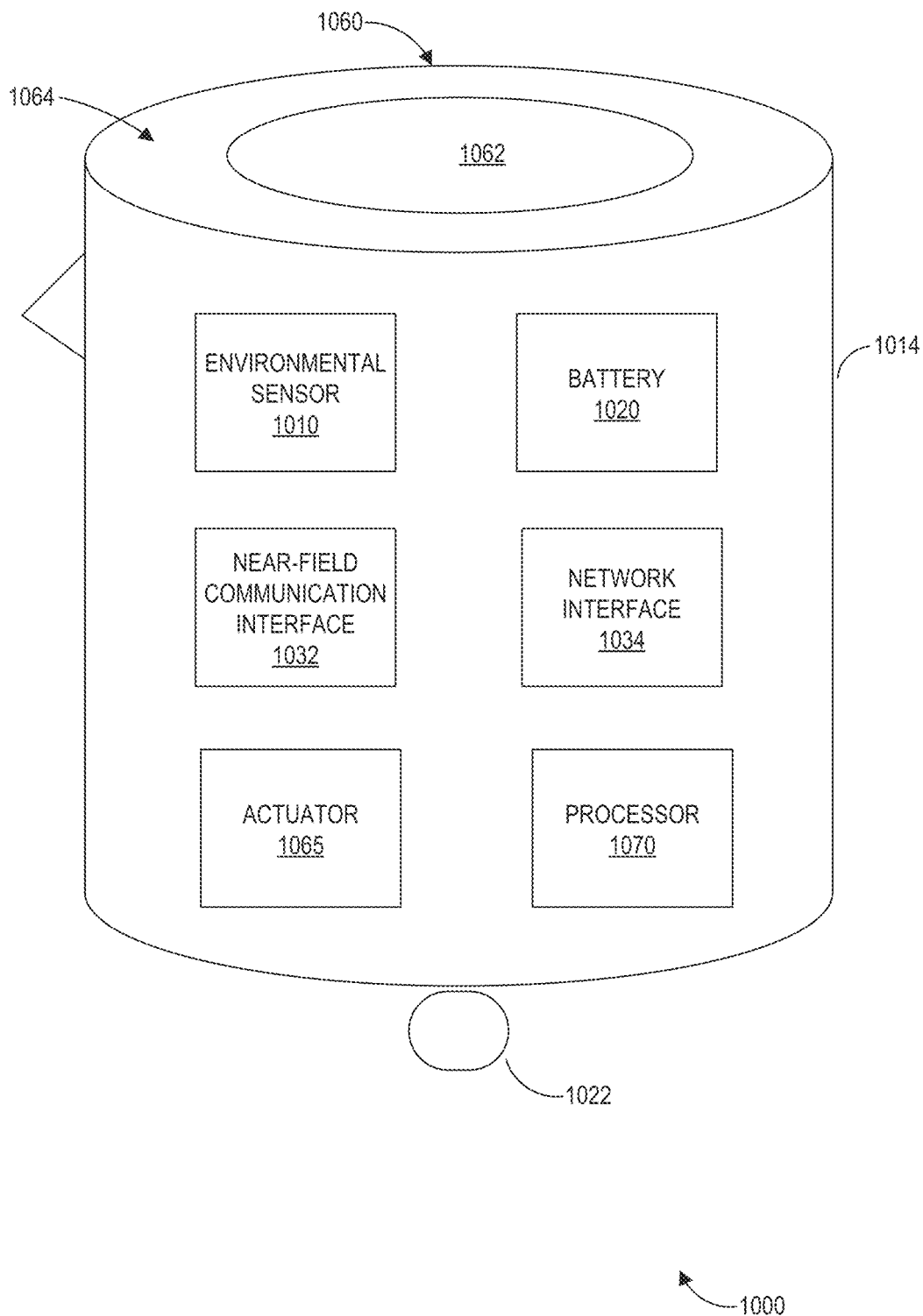
FIGS. 10A and 10B illustrate examples of components of a handheld controller.
Figure 10B:
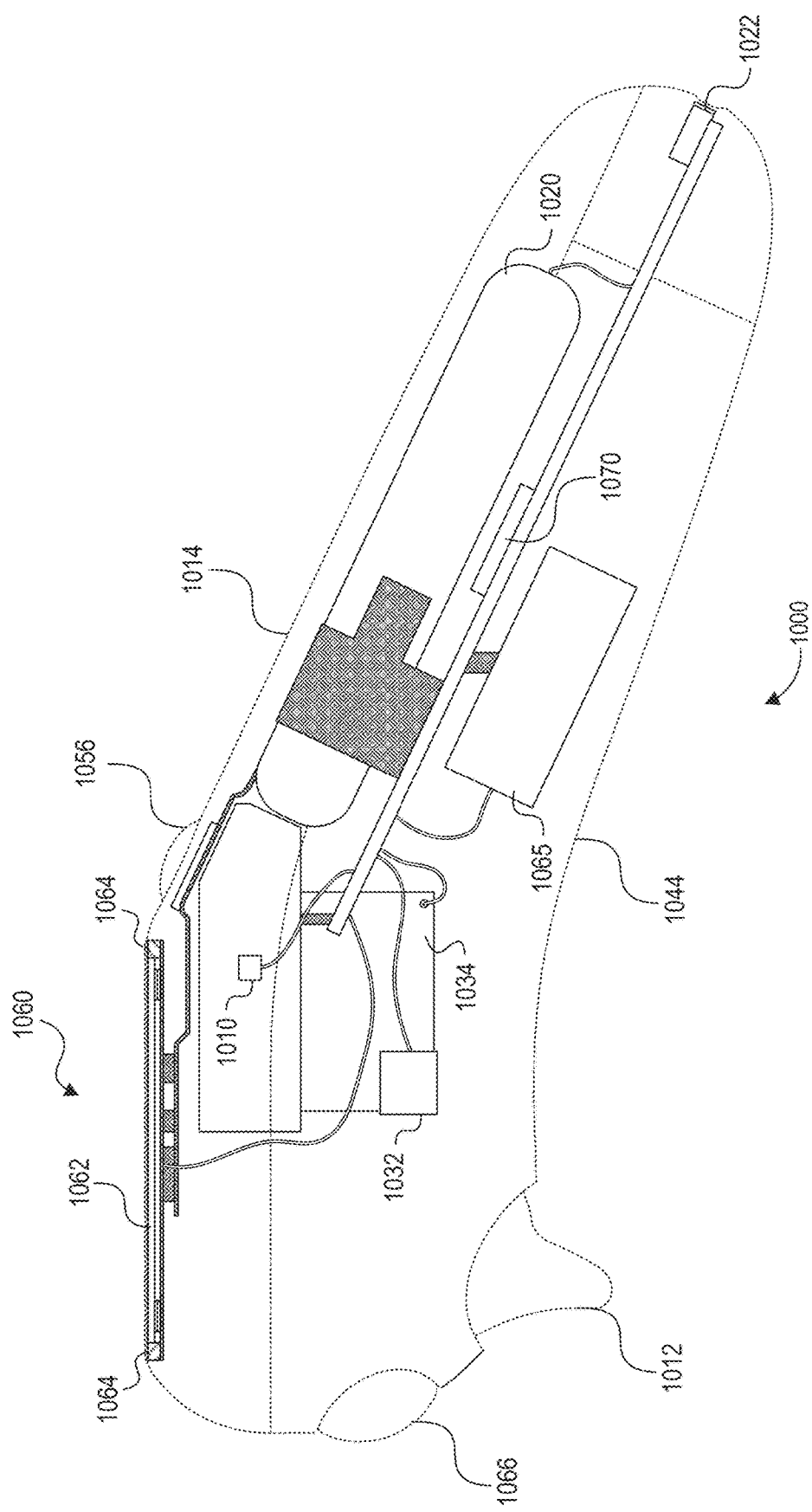

FIGS. 10A and 10B illustrate examples of components of a handheld controller 1000. The example controller 1000 can include a touchpad 1060 (which can include a touch surface 1062 and a light guide 1064), a trigger 1012, and a controller body 1014. The light guide 1064 may comprise user-interactable regions (e.g., touch sensitive) and may at least partially or completely surround the touch surface 1062. The controller 1000 can also include a variety of components, at least some of which may be disposed inside the body 1014 of the controller. These components will be described further below and can include an environmental sensor 1010, a battery 1020, a near-field communication (NFC) interface 1032, a network interface 1034, a haptic actuator 1065, and/or a processor 1070, among other components. A connection interface 1022 can be disposed at the bottom of the body 1014 to, for example, removably attach the controller 1000 to a base. The connection interface 1022 can be used to provide electrical power to charge the battery 1020 and to provide a communication link between the components of the controller and external devices (e.g., a computing device).

Bumper

The controller 1000 can include a button 1066 (also referred to as a bumper) that in the example shown in FIG. 10B is located at the front end of the controller, above the trigger 1012 and below the touchpad 1060. The bumper 1066 may provide an ergonomically comfortable place for the user to rest his or her forefinger. The bumper 1066 can comprise a touch sensitive surface implemented as, e.g., a depressible button, a capacitive touch sensor, a force-haptic element, etc.

In the example shown in FIG. 10B, the user can actuate the controller 1000 primarily using three fingers, e.g., the thumb to actuate the home button 1056 or the touchpad 1060, the forefinger to actuate the bumper 1066, and the middle finger to actuate the trigger 1012. Such a three-finger actuatable controller can permit the user to rapidly and efficiently provide user input without excessive and tiring use of just one finger (as may occur with mouse setups for desktop computers). The different buttons 1012, 1056, 1066 can provide different functionality, e.g., depending on whether a user is working within an application, scrolling through an application launcher, selecting objects in the environment, etc. In some cases, a user may use just the forefinger to switch back and forth between pressing the bumper or pulling the trigger.

As examples of bumper functionality, tapping the bumper while the user is looking at an application can bring up an options menu for that application, while long pressing the bumper can activate a manipulation sequence for virtual objects in the environment. For example, a long hold of the bumper can grab an object, and a long press on the bumper while pointing the controller 1000 toward the object can activate direct manipulation of the object (e.g., to move or re-orient the object). Tapping the bumper (or pulling the trigger) in a manipulation sequence can end the sequence.

Environmental Sensors

One or more environmental sensors 1010 can be configured to detect objects, stimuli, people, animals, locations, or other aspects of the environment around the user. The environmental sensors may include image capture devices (e.g., cameras), microphones, IMUs, accelerometers, compasses, global positioning system (GPS) units, radio devices, gyroscopes, altimeters, barometers, chemical sensors, humidity sensors, temperature sensors, external microphones, light sensors (e.g., light meters), timing devices (e.g., clocks or calendars), or any combination or subcombination thereof. In some embodiments, the environmental sensors may also include a variety of physiological sensors. These sensors can measure or estimate the user's physiological parameters such as heart rate, respiratory rate, galvanic skin response, blood pressure, encephalographic state, and so on. Environmental sensors may further include emissions devices configured to receive signals such as laser, visible light, invisible wavelengths of light, or sound (e.g., audible sound, ultrasound, or other frequencies). In some embodiments, one or more environmental sensors (e.g., cameras or light sensors) may be configured to measure the ambient light (e.g., luminance) of the environment (e.g., to capture the lighting conditions of the environment). Physical contact sensors, such as touch sensors, strain gauges, curb feelers, or the like, may also be included as environmental sensors.

The information acquired by the environmental sensor 1010 may be used to determine the light placement or movement patterns of the halo displayed on the controller. For example, the environmental sensor can determine the relative positions between the user and a physical object in the user's environment using a GPS sensor or an electromagnetic sensor (for detecting an electromagnetic signal associated with the physical object). The controller may present a halo whose placement can correspond to the location of the physical object. For example, if the object is in front of the user, the controller can present a halo in the 12 o'clock direction on the light guide 1064.

Additionally or alternatively, the information acquired by the environmental sensor 1010 can be used for one or more user interface operations. For example, the controller 1000 can detect the controller's 6DOF movement using the IMUs. For example, when the user rotates the controller 1000 while playing a game, an avatar (or other virtual object) controlled by the user (and displayed to the user via a wearable device) can rotate accordingly based on the movement data acquired by the IMUs. Additionally or alternatively to moving or rotating the controller 1000, the user can provide input on the touchpad 1060. For example, movement of the user's thumb toward or away from the user (e.g., along the long axis of the controller) can move the virtual object toward or away from the user. Movement of the user's thumb in a transverse direction back and forth on the touchpad 1060 can scale the size of the virtual object (e.g., from larger to smaller or vice versa) or rotation of the user's thumb around the touchpad can rotate the virtual object.

Although in this example, the environmental sensor is located on the controller 1000, in some embodiments, one or more environmental sensor may be located at other components of the wearable system described herein. For example, an environmental sensor (such as a camera or a physiological sensor) may be part of the display 220 of the wearable system 200.

As another example, the touch surface 1062 can be divided into two interactable regions with one region supporting the user's touch actions (such as e.g., simulating the functions of a multiple degree of freedom (DOF) directional d-pad) while another region supporting the user's swiping actions. The touch surface with two interactable regions may include concentric rings with one inner ring (as the first interactable region) and one outer ring (as the second interactable region). In this example, the light guide 1064 surrounding the touch surface may or may not be interactable but it can provide the visual feedback related to user's interactions or related to the wearable system. As will further be described herein, the type of user interactions supported by an interactable region may be changed dynamically based on events in the virtual environment or objects that the user is interacting with. For example, the outer region may be used as a d-pad when a user is browsing a web whereas the same region may support a swipe interaction (e.g., a circulate swipe) when a user is playing a virtual game.

Battery

The battery 1020 stores electric power for the controller 1000. The controller can determine the current status of the battery 1020 using the processor 1070. For example, the processor 1070 can measure and calculate the amount of power left in the battery 1020, whether the battery 1020 is currently being used, and the remaining life of the battery 1020 (such as when the battery 1020 will need to be replaced). The current status of the battery 1020 may be visualized via visual feedback presented on the light guide 1064, the home button 1056, an LED power indicator located on the bottom portion 1044 of the controller body 1014, or the display.

The controller 1000 can also determine the power consumption level of the controller using the processor 1070. For example, the controller can estimate the power consumption based on the estimated current required to output a certain light signature. The light signature may include a certain light placement or movement pattern of a halo associated with an indication of a process, a status, an object, or a user interaction. As an example of estimated electric currents associated with light signatures, the controller 1000 may require 5.6 mA to perform a 3 or 6 DOF calibration; 48 mA to find an object in the user's environment or to indicate a direction; and 54 mA to perform a wireless (e.g., Bluetooth) pairing. As another example of estimated currents for light signatures, 14.85 mA of the current may be consumed to provide an indication that the battery is less than 15%; 21.6 mA may be used to indicate that the controller is in a sleep mode or in an idle state; and 72.4 mA of current may be supplied to provide incoming notifications (such as, e.g., of new messages).

These estimated electric currents are merely examples. The specific amount of electric power needed may depend on various factors such as the type of LEDs used, the color of the LED, the placement and movement light patterns of a halo, etc. For example, the controller battery 1020 may drain 2 hours faster if every RGB LED of the touchpad 1060 is set to display white at 100% brightness all the time rather than displaying green at 100% brightness. This is because when an RGB LED displays green, only ⅓ of the LED (e.g., the green LED in the RGB LED) is utilized but when an RGB LED displays white, all LEDs in the RGB LED) are utilized.

To reduce the overall power consumption, the LEDs (particularly the LEDs that are interactable) may be spaced apart so as to reduce the total number of LEDs on the touchpad. Advantageously, in some embodiments, by spacing the LEDs apart, the power consumption may be reduced by up to 50%. The specific amount of reduction of the power consumption may depend on the layout of the LEDs.

The controller 1000 can manage the power consumption based on the objects that the user is interacting with. The controller 1000 can turn off the LEDs that do not have an active user interface option. For example, the controller 1000 may simulate a d-pad using an LED layout. However, during a game, the downward button may be disabled at a certain level. Accordingly, the controller may be configured not to display the bottom arc. Additionally or alternatively, the controller can manage the power consumption based on the status of the controller, the display, or other components of the wearable system. For example, the controller 1000 can turn the halo off after detecting a certain amount of inactivity. The controller can make such detection by calculating the amount of movement data of the controller acquired by the IMU.

In some embodiments, the wearable system may include a battery pack which may be attached to the user (such as, e.g., at the user's waist). The battery pack may be connected to the controller or the wearable device to supply power. The battery 1020 may be part of the battery pack or may be used in connection with the battery pack to supply electricity to the controller 1000.

Near-Field Communication (NFC) Interface and Network Interface

The NFC interface 1032 and the network interface 1034 can be configured to allow the controller to pair or communicate with a target object, such as e.g., another controller (or other user input device), a wearable display, a personal computer, a headphone, a key, a server, or another physical object. The NFC interface 1032 can be used for short-range wireless communications (such as when the controller is within 10 cm or less distance from the target object). In some embodiments, the NFC employs electromagnetic induction between two loop antennas when NFC-enabled devices— for example a controller and an HMD—are positioned close to each other (within about 10 cm) and wirelessly exchange information. This exchange of information may be operated within the globally available unlicensed radio frequency ISM band of 13.56 MHz over an ISO/IEC 18000-3 air interface at rates ranging from 106 to 424 Kbit/s. A variety of communications protocols and data exchange formats may be used for the NFC. Some non-limiting examples include: ISO/IEC 14443 and Felicia, ISO/ICE 18092, the standards defined by the NFC Forum and the GSMA group, etc.

The network interface 1034 can be configured to establish a connection and communicate with the target object via a network. The network may be a LAN, a WAN, a peer-to-peer network, radio frequency, Bluetooth, Wi-Fi, a cloud based network, or any other type of communication network.

For example, the controller and the wearable device may be paired using a wireless communication protocol such as, e.g., Bluetooth Low Energy (BLE). BLE may be advantageous in some embodiments because it can maintain bandwidth during BLE audio streaming. Various techniques may be used to pair the wearable device with the controller. For example, the wearable system can detect a certain light pattern presented by the controller by analyzing images of the controller obtained by an outward-facing camera. The detection of the light pattern can trigger the wearable system to start the pairing process. During the pairing process, the user may interact with the wearable display via a dialog box or user interface (UI) wizard to specify the settings and parameters associated with the controller, the wearable display, the type of information shared between the controller and the wearable display, the type of communication channel, etc.

Although in this example, the NFC interface 1032 and the network interface 1034 are illustrated as separate components, in some embodiments, the NFC interface 1032 and the network interface 1034 may be part of the same communication device or system.

Haptic Actuator

The controller 1000 can include a haptic actuator 1065. The haptic actuator 1065 can provide a haptic feedback to the user. One or more haptic actuators 1065 may be implemented in the controller 1000. A haptic actuator may be located at or near the trigger 1012, the touchpad 1060, and/or the controller body 1014.

The haptic feedback may be provided based on the user's interactions, the contextual information associated with an object or the user, status of the controller or other components of the wearable device, etc.

Processor

The hardware processor 1070 can be configured to process data acquired by the environmental sensor 1010. The processor 1070 can also receive from and send data to another device (such as the wearable display or another paired device) via the NFC interface 1032 or the network interface 1034. The processor 1070 can analyze these data to determine the placement or movement patterns of the halo at a given time. In some embodiments, the processor 1070 may work in conjunction with another computing device (such as, e.g., the wearable device, a game console, a remote server, or a personal computer) to analyze. For example, the processor 1070 may detect the user's movement using the environmental sensor 1010. The processor 1070 can pass the user's movement data to the local data processing module 260 or the remote processing module 270 for further analysis. The processor 1070 can receive the result of the analysis from the local data processing module 260 or the remote processing module 270. For example, the processor 1070 can receive information on the position and movement trajectory of a competitor in a game. Based on this information, the processor 1070 can instruct the LEDs to emit light for displaying a halo corresponding to the position and movement trajectory of the competitor.

The hardware processor 1070 can process various user inputs from the user's actuation of the controller 1000. For example, the hardware processor 1070 can process user inputs on the touchpad 1060, the trigger 1012, the home button 1056, the bumper 1066, etc. As an example, the hardware processor can detect a user's hand gesture on the touchpad 1060 by processing signals from the touch sensors. As described herein, the hardware processor 1070 can process the user's input and instruct other components of the controller 1000 (such as, e.g., the LEDs or the actuator 1065) to provide an indication of the user's actuation of the controller 1000.

Connection Interface

The connection interface 1022 may be used to establish a connection with another device. The connection may be a wireless or wired connection. For example, the connection interface 1022 may comprise a USB connector. The connection interface 1022 may also comprise a USB port, such as, e.g., a USB-B type port, USB-A type port, a micro USB, or USB Type C port, etc. The connection interface 1022 can also include a power cord for connecting to a power source for charging.

The example components illustrated in FIGS. 10A and 10B are not limiting examples, and the controller 1000 can include fewer or more or different components than illustrated. For example, the controller 1000 may not have an NFC interface 1032. As another example, the controller 1000 can include an optical emitter configured to emit a light (such as an infrared light) or an electro-magnetic emitter configured to generate or sense a magnetic field (e.g., used for electromagnetic tracking), etc. As yet another example, the NFC interface 1032 and the network interface 1034 may be part of the same communication system.

Alternate Control Modes

In some embodiments, a default mode for interacting with prisms relies on the user's head pose, which allows intuitive and quick movements of a cursor to focus and select objects. However, in embodiments where prisms are focused based purely on the head pose, especially small prisms that are far away may be difficult to focus on, making those prisms hard to interact with (e.g., pick up or transfer data from). Thus, in some embodiments the system is configured to also allow use of a 6DoF cursor to enable precise targeting, such as through the use of a handheld controller.

Figure 10C:
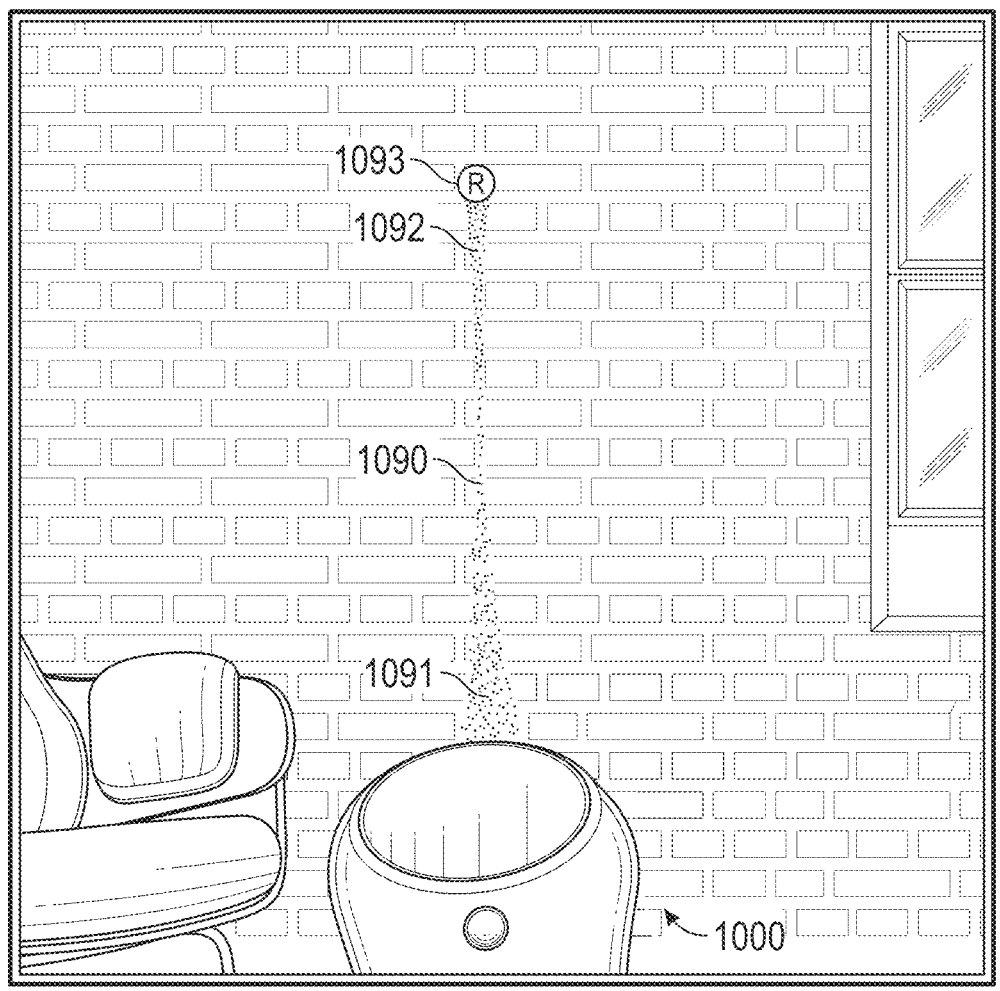
FIG. 10C illustrates an example controller from which a ray is depicted (e.g., through a wearable device).

FIG. 10C illustrates an example controller 1000 from which a ray 1090 is depicted (e.g., through a wearable device). The ray 1090 includes a controller end 1091 and a target end 1092 that intersects with an object in the MR environment and/or reaches a maximum ray length. The example ray 1090 indicates a cursor 1093 at the tip or target end 1092 of the ray. In this example, the cursor 1093 includes a character 'R' that indicates an associated user (e.g., "Ralph" is the user controlling the controller 1000). In other implementations, other indications of an associated user may be used. As is further discussed below, the ray 1090 may take on various forms and include various visual effects.

In some embodiments, the color and/or appearance of the ray may change depending on what type of content is being hovered over. In some implementations, the ray may disappear when it is not active (e.g. another type of cursor movement is taking precedence). In some embodiments, when dragging objects with physics, the ray can bend to help indicate the target path of the moved object. For example, the ray may bend in response to quick movements and/or attempted movements of an object into an unpermitted area (e.g., into a wall).

In some embodiments, the 6DoF cursor gets preference over head pose because it is more precise and natural for pointing at objects. In some embodiments, if the 6DoF cursor is not available or not pointing at a prism that is currently in view, the head pose may be used as a fallback for cursor input.

Touchpad and Controller Selection

In some implementations, focus may be controlled alternatively between the controller (e.g., a 6DoF input device) and the touchpad (e.g., a 3DoF input device). In some embodiments, a ray may be controlled with hand gestures in combination with, or as an alternative to, a 6DoF and/or 3DoF input device of a controller. In embodiments configured to detect hand gestures for use in movement of the ray, the system may be configured to have a precedence order and heuristics to choose which input should be used for moving the ray at any given time. For example, the system may be configured to use the controller to move the ray unless hand gestures are detected, and then to use the detected hand gestures for ray movement. In other embodiments, other rules for automatically switching between hand gesture and controller inputs may be implemented.

Use of multiple input devices may allow the system to realize one or more of the following advantages: more accurate and faster targeting of prisms and/or other UI elements, allows the user to seamlessly switch between touchpad cursor and 6DoF cursor while avoiding false movements; improves movement of prisms using a 6DoF controller by attaching them to the pointing ray; and/or support use of more than one controller in a shared environment, while allowing only one to move cursors at a time (in some embodiments).

In some embodiments, a 6DoF ray appears by default, and disappears during one of the following conditions.

1. An object is in direct manipulation mode. In this mode, the object is attached directly to the controllers transform starting from when the object was picked up.

2. The 6DoF pose of the controller has not been updated for a predetermined period (e.g. 3 seconds). In some implementations, this condition is triggered when movement of the controller is less than a threshold amount, which allows triggering in situations where the controller is immobile but there is noise from signals/readings which may appear as minimal movements of the controller.

3. The touchpad or another cursor input method is being used. In some implementations, use of these input methods causes the ray to be hid until they have completed. In some implementations, after the 6DoF cursor has been superseded, the ray is retracted and is only partially (or not at all) visible until one or more (or some combination of) the following conditions are met: a) the input method that superseded the 6DoF input is released (e.g. finger removed from touchpad), b) the user rotates the controller past a threshold in order to indicate the desire to point again (e.g., 15 degrees related to position of the controller when the 6DoF cursor went to sleep, was disabled, or was disabled for touch, within a predetermined time period, e.g., <1 second (and/or the touchpad hasn't been used for at least a threshold time, such as 0.5 seconds)), and/or the raycast of the controller strikes any UI Node or UI Panel 4. In some embodiments, if a second controller has an activated ray, e.g. if the other controller is being used to move an object, the ray may be hidden in certain circumstances.

5. The application is not receiving input because another process is superseding it.

Prism Focus

In embodiments where prisms receive focus purely on headpose, especially for small prisms that are far away it can be difficult to focus on them. However, through the use of a 6DoF cursor, precise targeting of objects, such as to change focus, are possible.

Prism focus may be determined based on the various rules that may be set at a system, user, and/or application level, for example. In general, a system may assign focus to a prism that is in view and is pointed at (e.g., by the 6DoF cursor), with head pose taking over input control if the focus is not being held by the controller. In some implementations, if a controller is moved to place the 6DoF cursor on a prism, and that prism is also within view at the time, this prism obtains prism focus (and steals focus from any other object that current has focus). This rule could be superseded if, for example, another controller is still raycasting another prism. In some implementations, if a controller stops raycasting a focused prism, or that prism goes out of view, focus on that prism is ended and the system looks for a next candidate for gaining focus. For example, a prism that is already receiving raycast and in view by another controller or head pose may be given focus. In some embodiments, if head pose raycasts a prism, and the existing focused prism is not being raycasted by a controller, this new prism obtains focus. In other embodiments, any number of other rules may be established to control focus ownership.

Figure 11:
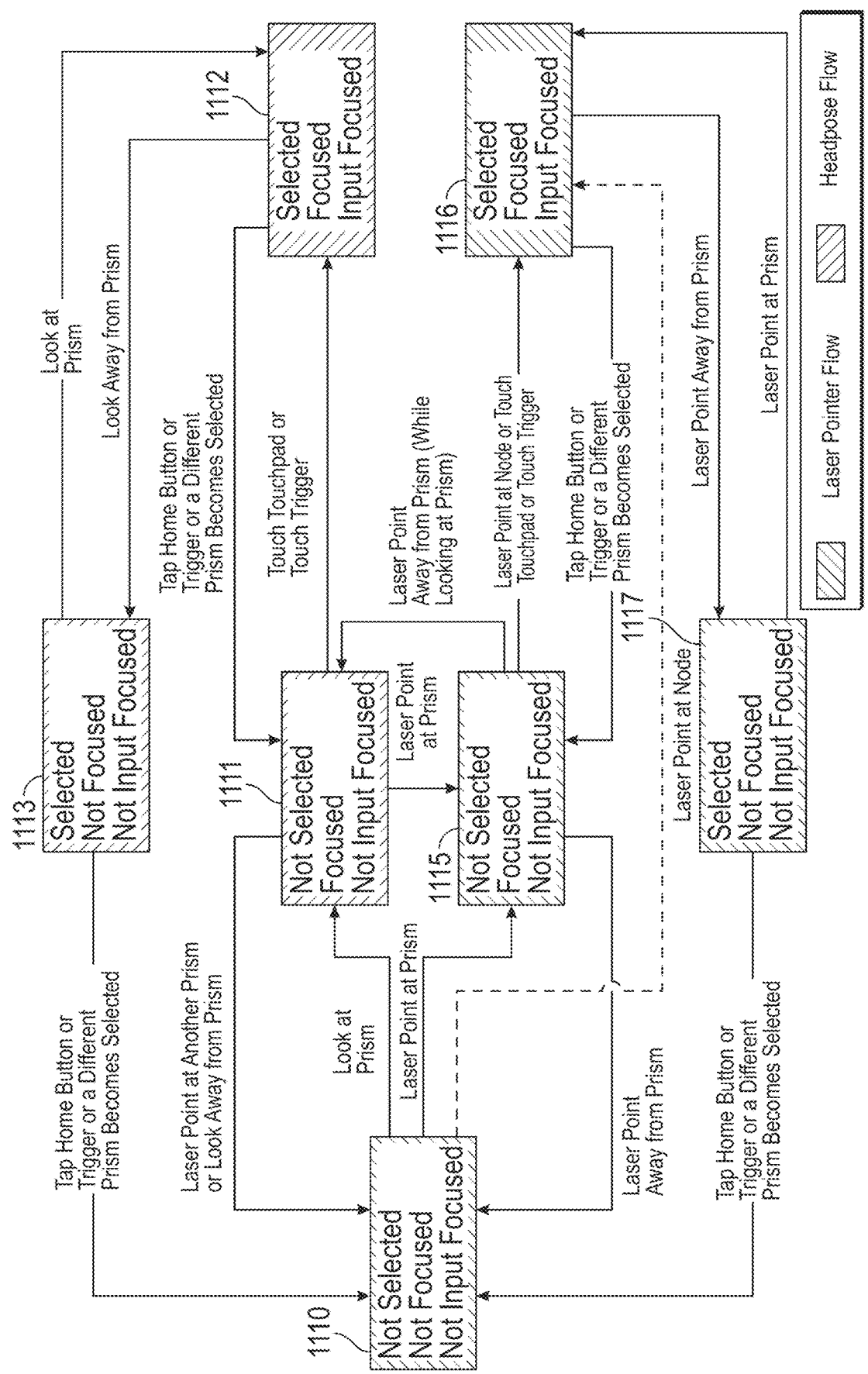
FIG. 11 is a flow diagram illustrating one embodiment of user interactions (on the connections between blocks) that may impact focus, input focus and selection in a MR environment.

FIG. 11 is a flow diagram illustrating one embodiment of user interactions (on the connections between blocks) that may impact focus, input focus and selection in a MR environment. In other implementations, other user inputs may be used to cause the transitions indicated.

Beginning at block 1110, a prism is not selected, focused, or input focused. For example, when a prism is first loaded, the system may be in this state. From block 1110, input can be provided via head pose or the controller. In particular, the user may turn their head pose so they are looking at a prism to cause focus to be on the prism at block 1111. Alternatively, the user can point the 6DoF controller at the prism to cause the focus to be on the prism at block 1115. From block 1111, the user can also point the 6DoF controller at the prism to move to block 1115. Similarly, while at block 1115 the flow moves to block 1111 if the user points the laser away from the prism but is now looking at the prism.

From block 1111, the user may touch the touchpad or the trigger to select and provide input focus to the prism at block 1112. At block 1112, the prism receives inputs from the touchpad and the user interacts with the prism. From block 1112, the user can return to block 1111, where the prism is no longer selected or receiving input focus, by tapping a home button on the controller or if a different prism becomes selected (e.g., by another user in a shared virtual environment). If the user looks away from the prism, flow continues to block 1113 where the prism is no longer focused or input focused, but remains selected. If the user then looks at the prism again, the flow moves back to block 1112 where the prism again becomes focused and input focused. Alternatively, from block 1113, if the user taps the home button or trigger, or a different prism become selected, flow returns to block 1110 where the prism is no longer selected, focused, or input focused.

From block 1115, the user may point the 6DoF controller at the prism, or touch the touchpad or the trigger to select and provide input focus to the prism at block 1116. At block 1116, the prism receives inputs from the 6DoF controller and the user may interact with the prism. From block 1116, the user can return to block 1115, where the prism is no longer selected or receiving input focus, by tapping a home button on the controller or if a different prism becomes selected (e.g., by another user in a shared virtual environment). If the user moves the 6DoF laser away from the prism, flow continues to block 1117 where the prism is no longer focused or input focused, but remains selected. If the user then moves the 6DoF cursor onto the prism again, the flow moves back to block 1116 where the prism again becomes focused and input focused. Alternatively, from block 1117, if the user taps the home button or trigger, or a different prism become selected, flow returns to block 1110 where the prism is no longer selected, focused, or input focused.

Figure 12:
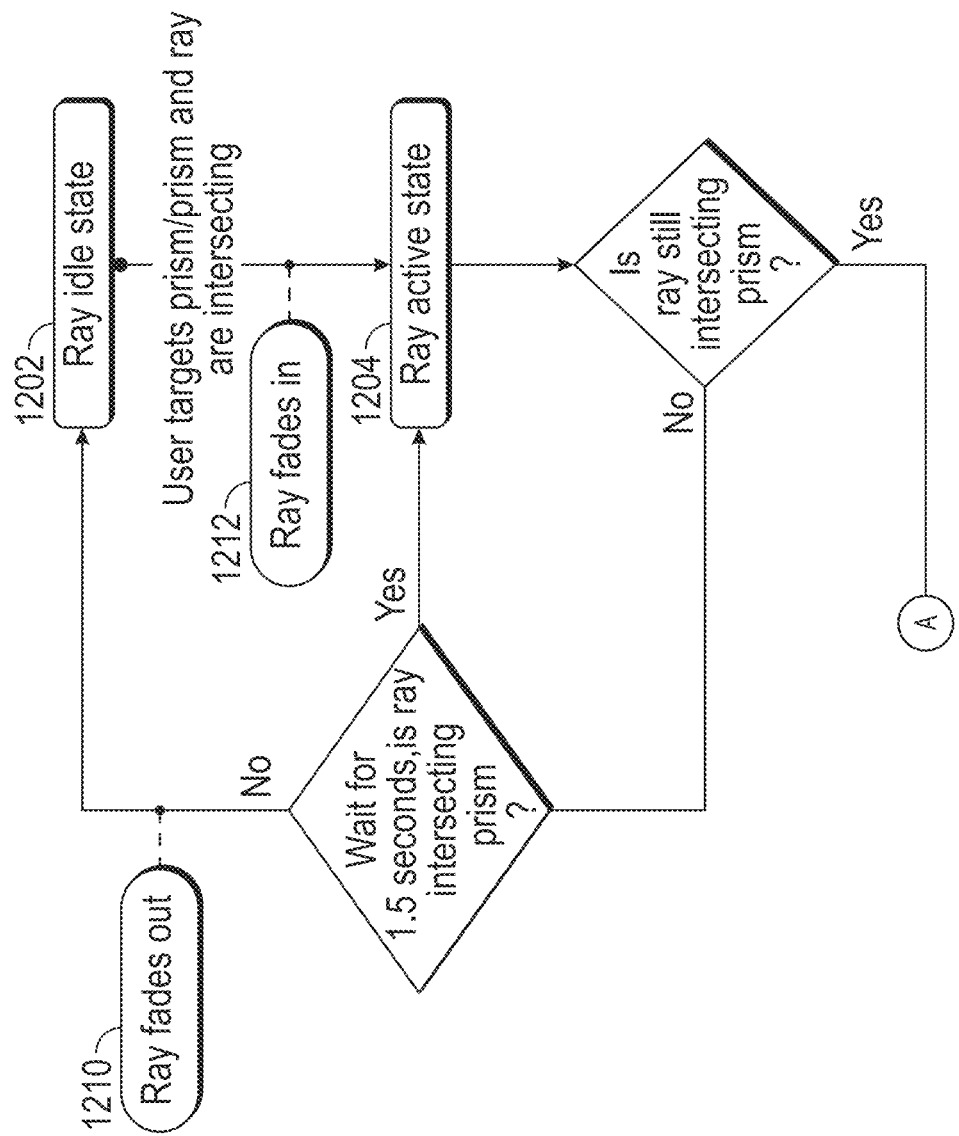
FIG. 12 is a flowchart illustrating one embodiment of how a ray may be affected by user inputs when switching between a controller (e.g., 6DoF input) and a touchpad (e.g., 3DoF input).
Figure 12:
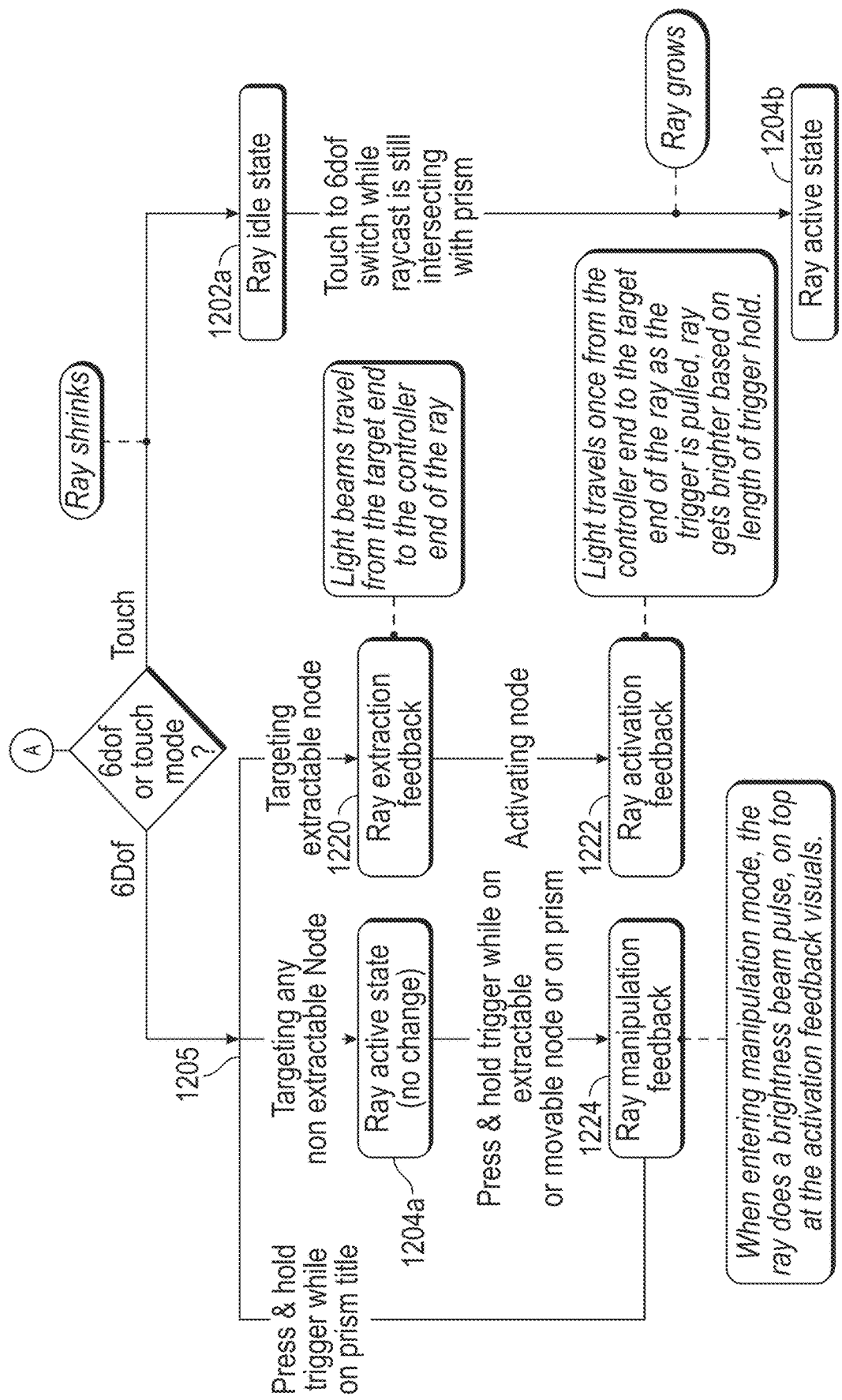

FIG. 12 is a flowchart illustrating one embodiment of how a ray may be affected by user inputs when switching between a controller (e.g., 6DoF input) and a touchpad (e.g., 3DoF input). Beginning at block 1202, such as when one or more prisms are displayed in a virtual environment associated with an application that has just launched, the ray is in an idle state. In the idle state, a small part of the ray coming from the totem to indicate 6dof is on may be displayed, while staying out of the way. FIG. 13A1 illustrates a controller 1330 in an idle state, such that the ray 1340 is in a shortened (or "idle") configuration. In some implementations, idle state of the ray is indicated in other manners. For example, in some embodiments, rather than shrinking the ray to a tiny length to indicate an idle state, the ray is maintained at the same length that it was when it last was Active. This embodiment may reduce the number of potentially distracting animations of the ray.

In the example of FIG. 13A1, the virtual environment includes a prism 1310 and several interactive virtual objects 1320 (including virtual objects 1320a, 1320b, 1320c, and 1320d). The virtual objects 1320 may indicate other prisms, media content, applications, etc., that are selectable and/or interactive. FIG. 13A2 is a rendering of a mixed reality view of a controller in the idle state, with the ray in a shortened configuration, and several virtual objects positioned on a back wall.

In some embodiments, when head pose intersects with the prism, but the controller cursor is not intersecting with the prism, one or more visual characteristics of the prism may be updated to indicate to the user that the prism is selectable. For example, a prism title and/or a glow behind the prism may be visible when the head pose intersects the prism. FIG. 13A3 is a rendering of a mixed reality view of a prism, including the title "Gallery" that is displayed when the head pose intersects the prism. Other visualizations and/or sound effects may be used alternatively.

Figure 13C:
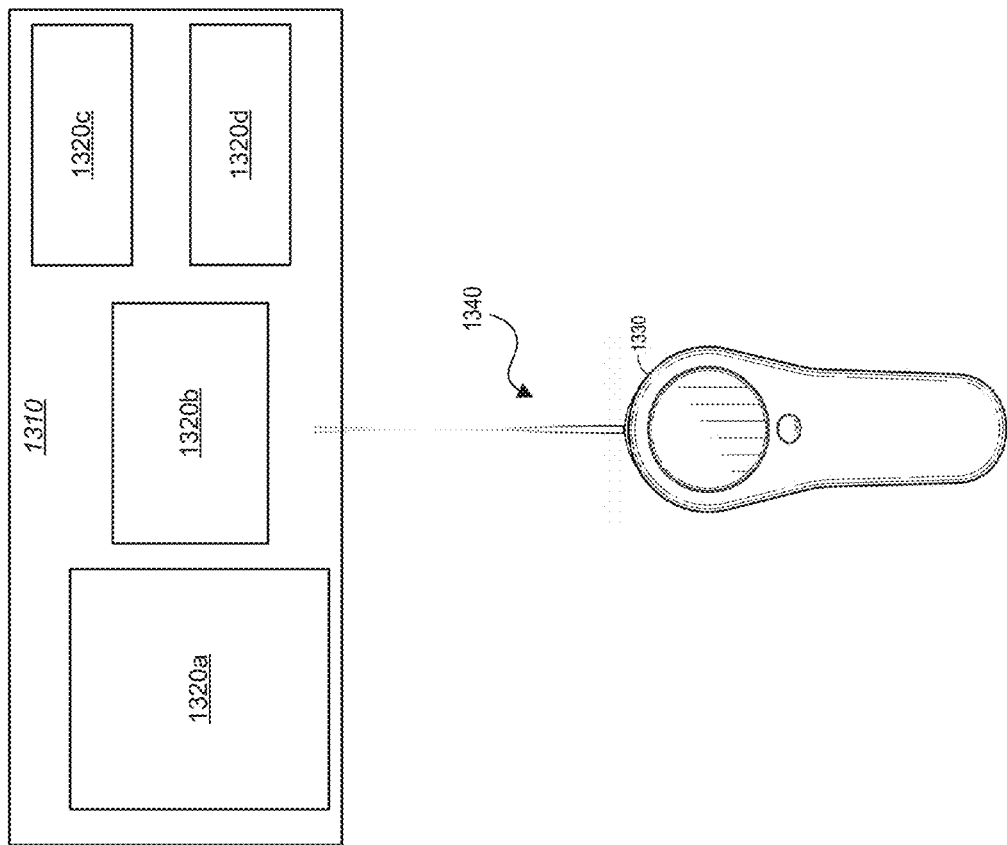
Figure 13D:
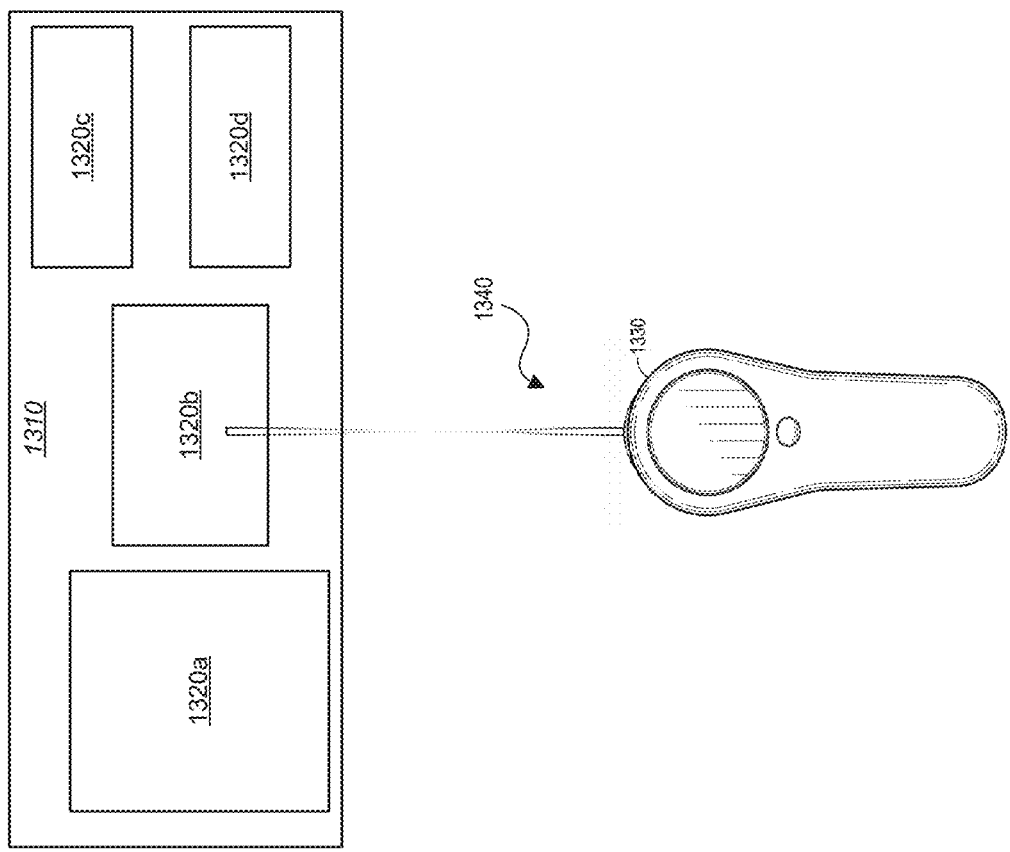

Returning to FIG. 12, if the user targets a prism with the 6DoF cursor, e.g., by pointing the controller towards the prism 1310, the ray enters an active state 1204 by extending outward along the controller axis towards the prism and/or virtual objects 1320 within the prism. FIGS. 13B-13D illustrate an example of the controller 1330 after it is moved such that the 6DoF cursor intersects with prism 1310, causing the ray to extend towards and onto the prism 1310 (as shown in the progression shown in FIGS. 13B-13D). In some implementations, a prism does not become active until both head pose and the 6DoF cursor intersects with the prism.

FIG. 13E1 illustrates an activation cursor 1342 at the target end of the ray 1340. An activation cursor may be indicated when the ray is active and/or when the ray is active and is positioned on a selectable virtual object, such as object 1320b. For example, the activation cursor 1342 may be shown when the ray 1340 intersects with the prism 1310 to indicate that the prism has been activated and is now receiving user inputs. FIG. 13E2 is a rendering of the mixed reality view discussed above with ray in an active state.

Returning to FIG. 12, if the ray remains active, e.g., targeting the prism, for a predetermined time (e.g., 1.5 seconds in the example of FIG. 12), the system moves to decision block 1205 where a determination is made as to whether the 6DoF or touchpad control should be active. In some implementations, the input device that controls state transitions of the prism is determined by rules, such as the decision tree illustrated in FIG. 11. For example, if the prism received focus by pointing the ray at the prism using the 6DoF cursor (block 1115 of FIG. 11), the controller or touchpad may be used to provide input. In some implementations, the application developer decides and programs into the application a default for which input method should be initially activated when the prism is selected. In other embodiments, the 6 DoF cursor may be active initially.

With the 6DoF cursor active, the flow of FIG. 12 proceeds to either blocks 1204a or 1220. More particularly, if the user is targeting content that is not extractable within the prism, the ray remains in the active state and is unchanged (block 1204a). However, if the user is targeting content that is extractable (or interactive in other manners, in some implementations), the ray may be updated to indicate an extraction process associated with the targeted content at block 1220. For example, the ray may include motons or a light traveling through the ray towards the user. FIG. 13F illustrates an example animation of the ray to indicate targeting of an extractable object 1320b. FIG. 13F1 shows a darkening and glow added to the object 1320b outline, such as to indicate that the object is the subject of the users focus. FIGS. 13F2, 13F3, and 13F4 illustrate three temporal snapshots of motons moving from the object 1320b (e.g., from the targeting end of the ray) towards the controller (e.g., towards the controller end of the ray). In other embodiments, other visual effects may be used to indicate that an object has extractable content and/or that the extractable content is being transferred to the user wearable device.

In some implementations, the extractable node may be activated by the user pressing the trigger of the controller (or other user input in some implementations), causing the ray to be updated to indicate activation of the node at block 1222. For example, the ray may be updated to send a light pulse from the controller end of the ray to the target end of the ray in response to the user pressing the trigger on an extractable node. As the user holds the trigger longer, the ray may get brighter to indicate a corresponding length of time the trigger has been held.

If the user is targeting a non-extractable node, the ray remains in the active state without any change at block 1204a. In the example of FIG. 12, the user may press and hold the trigger while on an extractable or movable node or on the prism to receive ray manipulation feedback, which may be visualized as a brightness beam pulse on the ray. If the user presses and holds the trigger while on the prism title, the flow returns to decision block 1205 to determine whether the user is targeting an extractable node.

If the touch input is active, after block 1204, the ray shrinks and returns to its idle state at block 1202a, such as in the example of FIG. 13B. With the ray in the idle state, input may be provided by the touchpad, such as to allow the user to provide input using three degrees of freedom available on the touchpad. From this state, when the 6DoF ray intersects the prism (e.g., for at least a predetermined time), the ray may grow again to the active state in block 1204b, and input may be controlled by the 6DoF cursor.

Example Color Treatments

The color and/or appearance of the ray may change depending on what the ray is pointing at. This may help the user understand what actions are possible at that time. In some implementations, different ray colors may be assigned to the following actions (in an example order of precedence): pointing at an extractable UI Node, performing a placement sequence, pointing at an activatable UI Node, pointing at a prism, and pointing at dead space.

If the ray intersects with a virtual object (e.g., a UI Node or UI Panel), the point of impact could show a cursor or reticle for precise aiming and state understanding. For example, the cursor could change based on the type of hovered node.

In a shared environment, e.g., where multiple users are each viewing portions of a shared virtual environment, each user may be associated with a different color ray. In this way, the users in the shared environment may more easily track movements of their own controller, as well as associate other rays with particular other users. In some embodiments, other characteristics of rays in a shared environment may be personalized to indicate an associated user, such as width, texture, animation, etc.

Example Bendy Ray Mode

Figure 14:
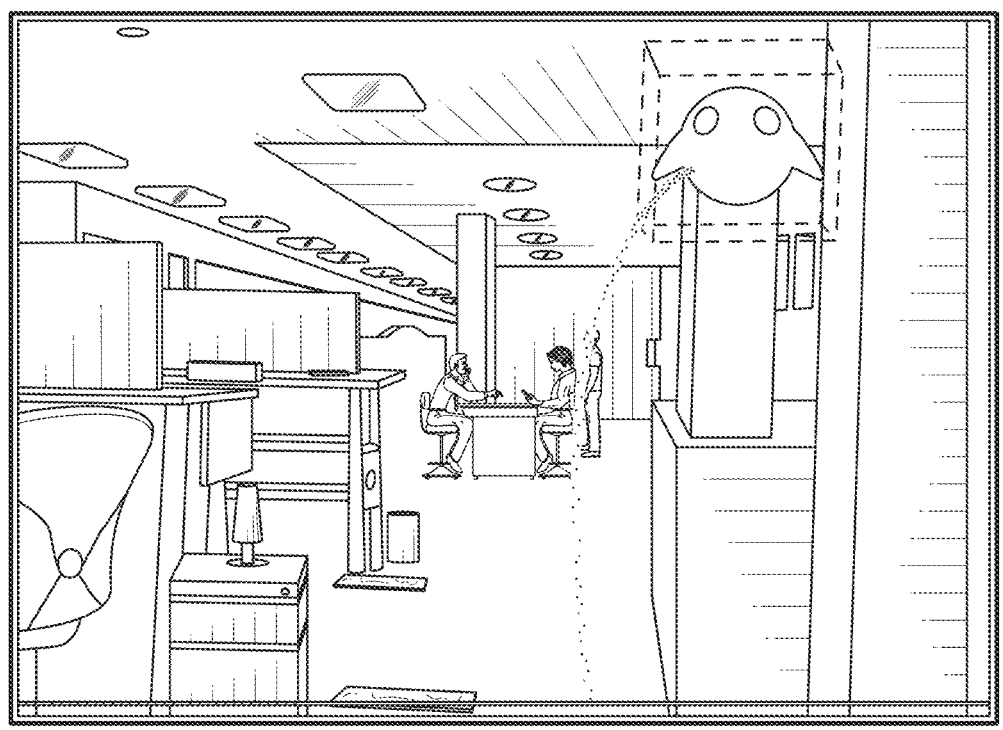
FIG. 14 illustrates an example movement of an object, where the ray is bent to indicate movement of the controller axis in relation to position of the object being moved.

In some embodiments, the ray may be depicted to emulate real-world physics characteristics similar to those of an elongated structure (e.g., a fishing pole or stick that may be used to point to and/or move objects). For example, when the ray is used to select an object and drag the object to another location, a physics model may be applied to the movement to "bend" the ray to create a lifelike effect. In some implementations, the ray is bent when moved at a high rate and/or acceleration. FIG. 14 illustrates an example movement of an object, where the ray is bent to indicate movement of the controller axis in relation to position of the object being moved. In some implementations, the ray might bend significantly if the user moves the 6DoF controller very quickly and the ray may band minimally if the user moves the 6DoF controller less quickly.

In some implementations, the ray may bend based on characteristics of an object selected by the ray. For example, the weight of a virtual object may proportionally impact how much of the ray bends and/or a direction of the bend. In some implementations, the ray may bend when moving an object to a location where the object is not permitted to go. For example, if a user attempts to move a virtual object into a wall, the virtual object may stop adjacent the wall while the ray bends to indicate that movement of the object has stopped and to indicate a virtual bending force on the ray. In some implementations, the ray may be used to indicate a target path of an object that is being moved. In other implementations, the ray may be bent based on one or more other characteristics of the environment, objects being interacted with in the environment, the user, and/or other characteristics of the MR environment. The discussion below provides further details regarding certain of these ray modification implementations, but others are also contemplated.

In some implementations, the ray is assigned a maximum length, such as 5 meters, which may be shortened if the ray comes in contact with a closer virtual or real-world object in the virtual environment. If the user is dragging an object around with 6DoF input, but the object isn't animating to immediately follow the ergonomic axis of the movement, the ray can be bent in a spline to show a physical tugging relationship. In some implementations, the bendy line is drawn by creating a chain of bones (e.g. 30 bones) which are then skinned with a cylinder of polygons. To animate the line, the bone positions may be set to match with interpolated locations along the Catmull-Rom spline segment. As long as the skin is attached to multiple bones, the segmentation may not be visible to a user of the system. Alternatively, if using a motion model with skinned bones is too expensive or looks too segmented, the bones may be removed and the vertices controlled using a vertex shader, such as, for example, the Catmull-Rom code.

Figure 15A:
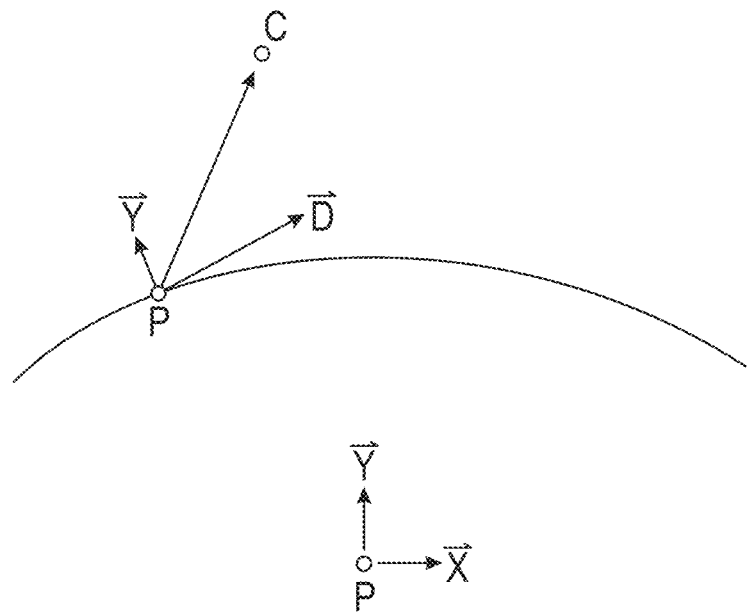
FIGS. 15A and 15B are graphs related to calculations for drawing bendy rays.
Figure 15B:
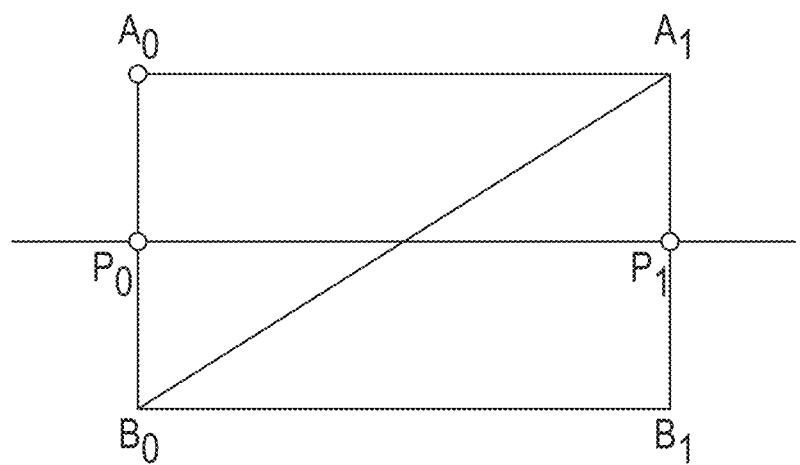

As shown in the examples of FIGS. 15A and 15B, another alternative of drawing bendy rays is to draw a strip of polygons along the line, and have the polygons rotated along the axis of the line, such as by using the equations, for a portion of the wet noodle:

P=a point on the line
C=camera location
D=the direction of the line at point P
Y=the normal of the cross-section edge of the polygons for point P
X=the perpendicular to Y The direction D of the line can be calculated from two points on the line P0 and P1, subtracting and normalizing (e.g., D=P1−P0). The distance along the "line" should be large enough not to veer into floating point inaccuracy, but not so large as the line has changed shape. Then the X vector is the cross product between that direction and the vector to the camera, and Y is the cross between D and Y. X and Y may be normalized using:

$$X=(C-P)\times D$$

$$Y=D\times X$$

If the width is w, two points can be generated. This will be a cross section of the strip. Note that the P0 and P1 in this case are not the same ones we used to calculate the line direction—these are two points to generate polygons.

$$A=P+(w/2)*X$$

$$B=P-(w/2)*X$$

If this is done for two points on the line, we get four points A0, B0, A1, B1 that we can use for two triangles (A0, A1, B0) and (B0, A1, B1). Because the line is bending and twisting to face the camera, our two cross sections segments (e.g. from A0 to B0) may not lie in the same plane, which may result in a crease between the two polygons at the diagonal, which is expected and desired. Also the two cross sections may not be parallel as the line bends, and that's also expected.

In some implementations, such as if the vector from a given point P to the camera and the direction line D are close to 0 or 180 degrees, the cross of those two vectors may become undefined. This could happen, for example, when the direction of the line is directly facing towards or away from the camera. In such as situation, an alternate point may be defined using the camera's up vector:

Calternate=C+CameraUp*1 meter.

The normals for the A and B points would be the Y vector for that point P on the curve. This should give smooth shading transitions between the segments because it's the normal of each polygon cross-section edge.

In some implementations, because of perspective, the perceived width of the line should get smaller as it gets farther from the camera, without the line diminishing to a single point. Thus, the width of the line may be increased or maintained at a certain width as it gets farther from the camera.

In some implementations, the 6DoF Cursor is usable to interact with scrollable UI elements, such as to allow the user to quickly apply scrolling or to exit a scrollable element. One or more of the following techniques may be used to implement such scrolling.

Cursor Pulling (The Prototype Default): Similar to touchpad based scroll behavior, pulling the 6DoF cursor to the edge of a scrollable UI will start scrolling the UI, until the user reaches the stop, or they apply a large enough delta to escape. One upside of this approach is that the user can interchangeably switch to touchpad cursor while still pointing at UI with 6DoF.

Touchpad Reserved for Scrolling: The touchpad may be used purely for scrolling when 6DoF is pointing at a scrollable UI element. A benefit of this approach is that scrolling becomes a deterministic and simple gesture. For example, a user could quickly switch between 6DoF and touchpad cursor to perform scrolling.

Dead Space Dragging: The user could point to dead space between UI Nodes in a scrollable UI and pull the trigger and drag the scrollable region.

Visible and Activatable Scrollbars: Scrollbars that the 6DoF cursor can point and click on (or drag).

Example Implementations

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example One

A computerized method, performed by a computing system having one or more hardware computer processors and one or more non-transitory computer readable storage device storing software instructions executable by the computing system to perform the computerized method comprising: accessing mixed reality environment data including information regarding a virtual environment and a real-world environment that are each at least partially visible to a user through a field of view of the wearable headset, the virtual environment including a one or more virtual objects that are selectable by the user; determining an input mode, wherein in a first input mode the controller provides targeting information based on six degrees of freedom (6 DoF) movements of the controller and in a second input mode the controller provides targeting information based on touchpad inputs of the handheld controller; and alternating between the input modes based on mode switch criteria.

Example Two

The method of example One, wherein the mode switch criteria indicate that the second input mode is activated upon determining that a 6 DoF pose of the controller has not substantially changed for a predetermined time period.

Example Three

The method of example Two, wherein the predetermined time period is three seconds.

Example Four

The method of example One, further comprising: when in the first input mode, depicting a ray extending from the controller along a controller axis that is co-linear with a central longitudinal axis of the controller.

Example Five

The method of example Four, further comprising: in response to inputs from the controller indicating targeting of a virtual object with extractable content, animating the ray to indicate content is transferrable to the mixed reality device.

Example Six

The method of example Four, further comprising: selecting visual effects of the ray based at least partly on a type of virtual object intersected by the ray or a type of action being performed by the user.

Example Seven

The method of example Six, wherein a color of the ray is selected based on a type of virtual object intersected by the ray.

Example Eight

The method of example Seven, wherein a different color of the ray is associated with each of: intersecting the ray with an extractable virtual object; performing a placement sequence; intersecting the ray with an activatable virtual object; intersecting the ray with a prism; and intersecting the ray with dead space.

Example Nine

The method of example Four, further comprising: in response to detecting mode switch criteria indicating change to the second input mode, causing a length of the ray to decrease.

Example Ten

The method of example Nine, wherein the length of the ray decreases until it is no longer visible in the second input mode.

Example Eleven

The method of example One, further comprising: when in the first input mode, determining a target area based on the targeting information and the mixed environment data; and in response to determining that the target area is not on a virtual object of the plurality of virtual objects, depicting a ray extending from the controller along a controller axis that is co-linear with a central longitudinal axis of the controller, wherein the ray is in an idle mode; or in response to determining that the target area is on a first virtual object of the plurality of virtual objects, depicting the ray in an active mode, wherein the ray extends to the first virtual object.

Example Twelve

The method of example One, wherein said determining the input mode comprises detecting any touchpad inputs and, if there are any touchpad inputs, selecting the second input mode.

Example Thirteen

The method of example Four, wherein mode switch criteria indicating change from the second input mode to the first input mode include one or more of: detecting no input from the touchpad for a predetermined time period; detecting rotation of the controller of at least a threshold angle of rotation; or detecting the ray intersecting with a user interface node.

Example Fourteen

The method of example Thirteen, wherein the threshold angle of rotation is 15 degrees from a position of the controller when last in the first input mode.

Example Fifteen

A computerized method, performed by a computing system having one or more hardware computer processors and one or more non-transitory computer readable storage device storing software instructions executable by the computing system to perform the computerized method comprising: identifying a location of a virtual cursor in a virtual environment of the user; determining a spatial relationship between the virtual cursor and a virtual object in the virtual environment; and calculating a curvature of a ray responsive to movement of the user input device and movement of the virtual object; and dynamically update depiction of the ray based on the calculated curvature of the ray.

Example Sixteen

The computerized method of example Fifteen, wherein curvature of the ray is proportional to speed of movement of the user input device.

Example Seventeen

The computerized method of example Fifteen, wherein attempted movement of the virtual object into an area of the virtual environment that the virtual object is not allowed to enter causes increased curvature of the ray.

Example Eighteen

The computerized method of example Fifteen, wherein an amount of curvature of the ray is further based on a difference between a desired location of the virtual object associated with a current position of the user input device and an actual location of the virtual object in the virtual environment.

Example Nineteen

The computerized method of example Fifteen, wherein curvature of the ray is calculated with a physics engine configured to imitate curvature of a fishing pole.

Example Twenty

A computerized method, performed by a computing system having one or more hardware computer processors and one or more non-transitory computer readable storage device storing software instructions executable by the computing system to perform the computerized method comprising: accessing mixed environment data including information regarding a virtual environment and real-world environments of a plurality of users, wherein the mixed environment data is at least partially visible to each of the plurality of users through a field of view of wearable headsets, the virtual environment including a plurality of virtual objects that are user selectable; determining that two or more of the plurality of users are providing inputs in the virtual environment associated with respective rays indicating targeting of the users; and assigning different visual effects to rays of each of the two or more users so that the rays are distinguishable by users viewing the virtual environment.

Example Twenty-One

The method of example Twenty, wherein the visual effects comprise different colors for each of the rays.

Example Twenty-Two

The method of example Twenty, wherein the visual effects comprise cursors at target ends of the rays including an alphanumeric character associated with the user.

Example Twenty-Three

The method of example Twenty, further comprising: determining that a first user has control over an application in the virtual environment and, responsive to the determination, cause a first ray associated with the first user to include a cursor tip at a targeting end of the ray; and cause rays associated with other users in the virtual environment to not include the cursor tip.

Example Twenty-Four

The method of example Twenty, further comprising: determining that a first user has control over an application in the virtual environment and, responsive to the determination, cause a first ray associated with the first user to be brighter than rays associated with other users in the virtual environment.

Example Twenty-Five

A computerized method, performed by a computing system having one or more hardware computer processors and one or more non-transitory computer readable storage device storing software instructions executable by the computing system to perform the computerized method comprising: accessing mixed reality environment data including information regarding a virtual environment and a real-world environment that are each at least partially visible to a user through a field of view of the wearable headset, the virtual environment including a one or more virtual objects that are selectable by the user; determining an input mode, wherein in a first input mode the controller provides targeting information based on six degrees of freedom (6 DoF) movements of the controller and in a second input mode the controller provides targeting information based on touchpad inputs of the handheld controller; and alternating between the input modes based on mode switch criteria.

Example Twenty-Six

The method of example twenty-five, wherein the mode switch criteria indicate that the second input mode is activated upon determining that a 6 DoF pose of the controller has not substantially changed for a predetermined time period.

Example Twenty-Seven

The method of example twenty-six, wherein the predetermined time period is three seconds.

Example Twenty-Eight

The method of example twenty-five, further comprising: when in the first input mode, depicting a ray extending from the controller along a controller axis that is co-linear with a central longitudinal axis of the controller.

Example Twenty-Nine

The method of example twenty-eight, further comprising: in response to inputs from the controller indicating targeting of a virtual object with extractable content, animating the ray to indicate content is transferrable to the mixed reality device.

Example Thirty

The method of example twenty-eight, further comprising: selecting visual effects of the ray based at least partly on a type of virtual object intersected by the ray or a type of action being performed by the user.

Example Thirty-One

The method of example thirty, wherein a color of the ray is selected based on a type of virtual object intersected by the ray.

Example Thirty-Two

The method of example thirty-one, wherein a different color of the ray is associated with each of: intersecting the ray with an extractable virtual object; performing a placement sequence; intersecting the ray with an activatable virtual object; intersecting the ray with a prism; and intersecting the ray with dead space.

Example Thirty-Three

The method of example twenty-eight, further comprising: in response to detecting mode switch criteria indicating change to the second input mode, causing a length of the ray to decrease.

Example Thirty-Four

The method of example thirty-three, wherein the length of the ray decreases until it is no longer visible in the second input mode.

Example Thirty-Five

The method of example twenty-five, further comprising: when in the first input mode, determining a target area based on the targeting information and the mixed environment data; and in response to determining that the target area is not on a virtual object of the plurality of virtual objects, depicting a ray extending from the controller along a controller axis that is co-linear with a central longitudinal axis of the controller, wherein the ray is in an idle mode; or in response to determining that the target area is on a first virtual object of the plurality of virtual objects, depicting the ray in an active mode, wherein the ray extends to the first virtual object.

Example Thirty-Six

The method of example twenty-five, wherein said determining the input mode comprises detecting any touchpad inputs and, if there are any touchpad inputs, selecting the second input mode.

Example Thirty-Seven

The method of example twenty-eight, wherein mode switch criteria indicating change from the second input mode to the first input mode include one or more of: detecting no input from the touchpad for a predetermined time period; detecting rotation of the controller of at least a threshold angle of rotation; or detecting the ray intersecting with a user interface node.

Example Thirty-Eight

The method of example thirty-seven, wherein the threshold angle of rotation is fifteen degrees from a position of the controller when last in the first input mode.

Example Thirty-Nine

A computerized method, performed by a computing system having one or more hardware computer processors and one or more non-transitory computer readable storage device storing software instructions executable by the computing system to perform the computerized method comprising: identifying a location of a virtual cursor in a virtual environment of the user; determining a spatial relationship between the virtual cursor and a virtual object in the virtual environment; and calculating a curvature of a ray responsive to movement of the user input device and movement of the virtual object; and dynamically update depiction of the ray based on the calculated curvature of the ray.

Example Forty

The computerized method of example thirty-nine, wherein curvature of the ray is proportional to speed of movement of the user input device.

Example Forty-One

The computerized method of example thirty-nine, wherein attempted movement of the virtual object into an area of the virtual environment that the virtual object is not allowed to enter causes increased curvature of the ray.

Example Forty-Two

The computerized method of example thirty-nine, wherein an amount of curvature of the ray is further based on a difference between a desired location of the virtual object associated with a current position of the user input device and an actual location of the virtual object in the virtual environment.

Example Forty-Three

The computerized method of example thirty-nine, wherein curvature of the ray is calculated with a physics engine configured to imitate curvature of a fishing pole.

Example Forty-Four

A computerized method, performed by a computing system having one or more hardware computer processors and one or more non-transitory computer readable storage device storing software instructions executable by the computing system to perform the computerized method comprising: accessing mixed environment data including information regarding a virtual environment and real-world environments of a plurality of users, wherein the mixed environment data is at least partially visible to each of the plurality of users through a field of view of wearable headsets, the virtual environment including a plurality of virtual objects that are user selectable; determining that two or more of the plurality of users are providing inputs in the virtual environment associated with respective rays indicating targeting of the users; and assigning different visual effects to rays of each of the two or more users so that the rays are distinguishable by users viewing the virtual environment.

Example Forty-Five

The method of example forty-four, wherein the visual effects comprise different colors for each of the rays.

Example Forty-Six

The method of example forty-four, wherein the visual effects comprise cursors at target ends of the rays including an alphanumeric character associated with the user.

Example Forty-Seven

The method of example forty-four, further comprising: determining that a first user has control over an application in the virtual environment and, responsive to the determination, cause a first ray associated with the first user to include a cursor tip at a targeting end of the ray; and cause rays associated with other users in the virtual environment to not include the cursor tip.

Example Forty-Eight

The method of example forty-four, further comprising: determining that a first user has control over an application in the virtual environment and, responsive to the determination, cause a first ray associated with the first user to be brighter than rays associated with other users in the virtual environment.

As noted above, implementations of the described examples provided above may include hardware, a method or process, and/or computer software on a computer-accessible medium.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some implementations, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example implementations. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every implementation.

Conditional language used herein, such as, among others, "can," "could," "might," "may," "e.g.," and the like, unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without author input or prompting, whether these features, elements and/or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain implementations require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system comprising:
   a mixed reality device including a wearable headset and a handheld controller;
   a hardware computer processor; and
   a non-transitory computer readable medium having software instructions stored thereon, the software instructions executable by the hardware computer processor to cause the system to perform operations comprising:
   accessing mixed reality environment data including information regarding a virtual environment and a real-world environment that are each at least partially visible to a user through a field of view of the wearable headset, the virtual environment including one or more virtual objects that are selectable by the user;
   determining an input mode, wherein in a first input mode the controller provides targeting information based on six degrees of freedom (6 DoF) movements of the controller and in a second input mode the controller provides targeting information based on touchpad inputs of the handheld controller;
   alternating between the input modes based on mode switch criteria; and
   when in the first input mode, determining a target area based on the targeting information and the mixed environment data; and
      in response to determining that the target area is not on a virtual object of the plurality of virtual objects, depicting a ray extending from the controller along a controller axis that is co-linear with a central longitudinal axis of the controller, wherein the ray is in an idle mode; or
      in response to determining that the target area is on a first virtual object of the plurality of virtual objects, depicting the ray in an active mode, wherein the ray extends to the first virtual object.

2. The system of claim 1, wherein the mode switch criteria indicate that the second input mode is activated upon determining that a 6 DoF pose of the controller has not substantially changed for a predetermined time period.

3. The system of claim 2, wherein the predetermined time period is three seconds.

4. The system of claim 1, further comprising:
   when in the first input mode, depicting a ray extending from the controller along a controller axis that is co-linear with a central longitudinal axis of the controller.

5. The system of claim 4, further comprising:
   in response to inputs from the controller indicating targeting of a virtual object with extractable content, animating the ray to indicate content is transferrable to the mixed reality device.

6. The system of claim 4, further comprising:
   selecting visual effects of the ray based at least partly on a type of virtual object intersected by the ray or a type of action being performed by the user.

7. The system of claim 6, wherein a color of the ray is selected based on a type of virtual object intersected by the ray.

8. The system of claim 7, wherein a different color of the ray is associated with each of:
   intersecting the ray with an extractable virtual object;
   performing a placement sequence;
   intersecting the ray with an activatable virtual object;
   intersecting the ray with a prism; and
   intersecting the ray with dead space.

9. The system of claim 4, further comprising:
   in response to detecting mode switch criteria indicating change to the second input mode, causing a length of the ray to decrease.

10. The system of claim 9, wherein the length of the ray decreases until it is no longer visible in the second input mode.

11. The system of claim 1, wherein said determining the input mode comprises detecting any touchpad inputs and, if there are any touchpad inputs, selecting the second input mode.

12. The system of claim 4, wherein mode switch criteria indicating change from the second input mode to the first input mode include one or more of:
- detecting no input from the touchpad for a predetermined time period;
- detecting rotation of the controller of at least a threshold angle of rotation; or
- detecting the ray intersecting with a user interface node.

13. The system of claim 12, wherein the threshold angle of rotation is 15 degrees from a position of the controller when last in the first input mode.

14. A computerized method, performed by a computing system having one or more hardware computer processors and one or more non-transitory computer readable storage device storing software instructions executable by the computing system to perform the computerized method comprising:
- accessing mixed reality environment data including information regarding a virtual environment and a real-world environment that are each at least partially visible to a user through a field of view of a wearable headset, the virtual environment including one or more virtual objects that are selectable by the user;
- determining an input mode, wherein in a first input mode a handheld controller provides targeting information based on six degrees of freedom (6 DoF) movements of the controller and in a second input mode the controller provides targeting information based on touchpad inputs of the handheld controller;
- alternating between the input modes based on mode switch criteria; and
- when in the first input mode, determining a target area based on the targeting information and the mixed environment data; and
  - in response to determining that the target area is not on a virtual object of the plurality of virtual objects, depicting a ray extending from the controller along a controller axis that is co-linear with a central longitudinal axis of the controller, wherein the ray is in an idle mode; or
  - in response to determining that the target area is on a first virtual object of the plurality of virtual objects, depicting the ray in an active mode, wherein the ray extends to the first virtual object.

15. A non-transitory computer readable medium having software instructions stored thereon, the software instructions executable by a hardware computer processor to perform operations comprising:
- accessing mixed reality environment data including information regarding a virtual environment and a real-world environment that are each at least partially visible to a user through a field of view of a wearable headset, the virtual environment including one or more virtual objects that are selectable by the user;
- determining an input mode, wherein in a first input mode a handheld controller provides targeting information based on six degrees of freedom (6 DoF) movements of the controller and in a second input mode the controller provides targeting information based on touchpad inputs of the handheld controller;
- alternating between the input modes based on mode switch criteria; and
- when in the first input mode, determining a target area based on the targeting information and the mixed environment data; and
  - in response to determining that the target area is not on a virtual object of the plurality of virtual objects, depicting a ray extending from the controller along a controller axis that is co-linear with a central longitudinal axis of the controller, wherein the ray is in an idle mode; or
  - in response to determining that the target area is on a first virtual object of the plurality of virtual objects, depicting the ray in an active mode, wherein the ray extends to the first virtual object.

\* \* \* \* \*